US011902436B1

(12) United States Patent
Carlough et al.

(10) Patent No.: US 11,902,436 B1
(45) Date of Patent: *Feb. 13, 2024

(54) CRYPTOGRAPHIC KEY MANAGEMENT TO PREVENT DATA EXFILTRATION

(71) Applicant: Amazon Technologies, Inc., Seattle, WA (US)

(72) Inventors: Alexis Lynn Carlough, Seattle, WA (US); William Frederick Hingle Kruse, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/081,377

(22) Filed: Dec. 14, 2022

Related U.S. Application Data

(63) Continuation of application No. 17/139,198, filed on Dec. 31, 2020, now Pat. No. 11,569,992, which is a continuation of application No. 16/428,535, filed on May 31, 2019, now Pat. No. 10,917,240, which is a continuation of application No. 15/199,808, filed on Jun. 30, 2016, now Pat. No. 10,313,117.

(51) Int. Cl.
| *H04L 9/08* | (2006.01) |
| *G06F 21/60* | (2013.01) |
| *H04L 9/30* | (2006.01) |
| *H04L 9/40* | (2022.01) |
| *H04L 9/32* | (2006.01) |
| *G06F 21/62* | (2013.01) |
| *H04L 9/06* | (2006.01) |

(52) U.S. Cl.
CPC ............ *H04L 9/088* (2013.01); *G06F 21/602* (2013.01); *G06F 21/6218* (2013.01); *H04L 9/0643* (2013.01); *H04L 9/083* (2013.01); *H04L 9/0861* (2013.01); *H04L 9/302* (2013.01); *H04L 9/3271* (2013.01); *H04L 63/0442* (2013.01); *H04L 2209/24* (2013.01)

(58) Field of Classification Search
CPC ................................................... H04L 9/088
See application file for complete search history.

(56) References Cited

U.S. PATENT DOCUMENTS

| 2005/0238174 A1 | 10/2005 | Kreitzer |
| 2006/0106729 A1 | 5/2006 | Roberts, Jr. |

(Continued)

OTHER PUBLICATIONS

Arnab et al., "Fairer Usage Contracts For DRM," Proceedings of the 5th ACM workshop on Digital rights management (DRM '05), Nov. 7, 2005, pp. 1-7.

(Continued)

*Primary Examiner* — Bradley W Holder
(74) *Attorney, Agent, or Firm* — Davis Wright Tremaine LLP

(57) ABSTRACT

A cryptographic key management service receives a request, associated with a principal, to use a cryptographic key to perform a cryptographic operation. In response to the request, the service determines whether a rate limit specific to the principal is associated with the cryptographic key. If the rate limit is associated with the cryptographic key, the service generates a response to the request that conforms to the rate limit. The service provides the response in response to the request.

20 Claims, 12 Drawing Sheets

(56) References Cited

U.S. PATENT DOCUMENTS

| | | | |
|---|---|---|---|
| 2009/0164632 A1* | 6/2009 | Kumar | H04L 67/5651 709/225 |
| 2009/0210704 A1 | 8/2009 | Han | |
| 2009/0232312 A1* | 9/2009 | Inoue | G11B 20/00086 380/278 |
| 2010/0278191 A1 | 11/2010 | Gupta et al. | |
| 2011/0078457 A1* | 3/2011 | Starr | H04L 9/0897 713/189 |
| 2012/0288089 A1* | 11/2012 | Sauerwald | H04L 9/0866 380/44 |

OTHER PUBLICATIONS

Zhang et al., "Research on Usage Control Model with Delegation Characteristics Based on OM-AM Methodology," 2007 IFIP International Conference on Network and Parallel Computing Workshops (NPC 2007), Sep. 18, 2007, pp. 238-243.

\* cited by examiner

US 11,902,436 B1

CRYPTOGRAPHIC KEY MANAGEMENT TO PREVENT DATA EXFILTRATION

CROSS-REFERENCE TO RELATED APPLICATIONS

This application is a continuation of U.S. patent application Ser. No. 17/139,198, filed Dec. 31, 2020, entitled "CRYPTOGRAPHIC KEY MANAGEMENT TO PREVENT DATA EXFILTRATION," which is a continuation of U.S. patent application Ser. No. 16/428,535, filed May 31, 2019, now U.S. Pat. No. 10,917,240 entitled "CRYPTOGRAPHIC KEY MANAGEMENT TO PREVENT DATA EXFILTRATION," which is a continuation of U.S. patent application Ser. No. 15/199,808, filed Jun. 30, 2016, now U.S. Pat. No. 10,313,117, entitled "CRYPTOGRAPHIC KEY MANAGEMENT TO PREVENT DATA EXFILTRATION," the disclosures of which are incorporated herein by reference in their entirety.

BACKGROUND

Customers of a computing resource service provider or other service providers often store sensitive information using a variety of services provided by these service providers. To ensure the security of this sensitive information, the customers of these service providers often use cryptographic keys to encrypt the sensitive information. The cryptographic keys may be managed by these service providers, which may control access to the cryptographic keys and enable authorized users to access these cryptographic keys. However, some users of these cryptographic keys may have malicious intent that is unknown to the customers of the computing resource service provider. Preventing against such users is complex and may require extensive use of monitoring resources to discover.

BRIEF DESCRIPTION OF THE DRAWINGS

Various techniques will be described with reference to the drawings, in which.

DETAILED DESCRIPTION

Figure 1:
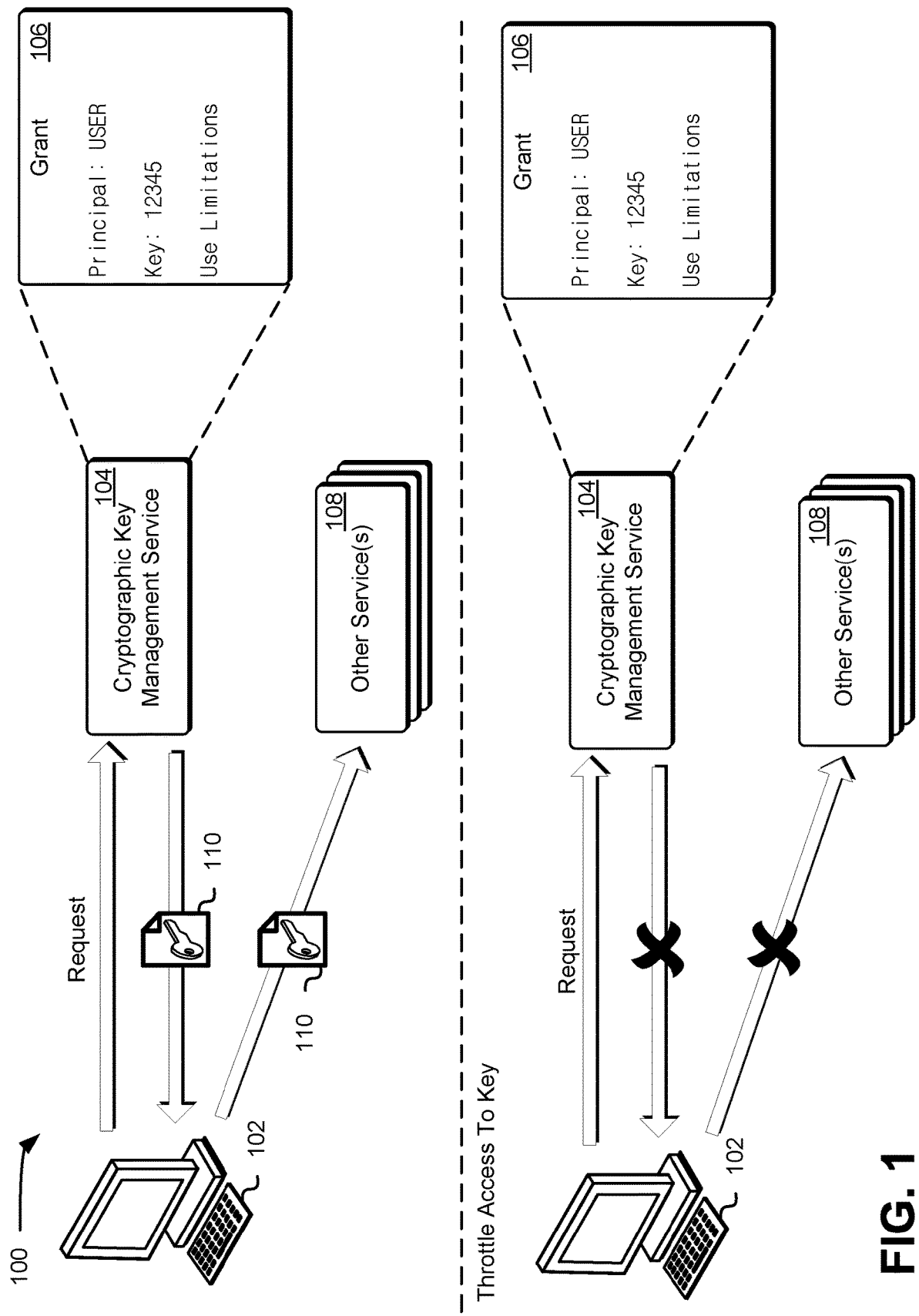
FIG. 1 shows an illustrative example of an environment in which various embodiments can be implemented.

This disclosure relates to limiting the rate of access to cryptographic keys that can be used to decrypt data that is protected using the cryptographic keys. In an example, a customer of a computing resource service provider submits a request to a cryptographic key management service to impose a rate limit for accessing a cryptographic key managed by the computing resource service provider. For instance, a customer of the computing resource service provider may submit a request to the cryptographic key management service to generate a grant that can be used to control access to the customer's cryptographic keys. The grant may specify one or more entities that may be authorized to use the customer's cryptographic keys, as well as any number of conditions that may be imposed to regulate these entities' use of the cryptographic keys. Through the grant, the customer may impose a rate limit for using the customer's cryptographic keys to decrypt data. In response to the request, the cryptographic key management service may enforce the new grant. Further, in some examples, the cryptographic key management service can implement a token container (often referred to as a token bucket), which may comprise a number of tokens in relation to the rate limit imposed in the grant. For instance, in response to a request to utilize a cryptographic key, the cryptographic key management service may deduct a token from the token container and enable use of the cryptographic key. If the token container does not have any tokens available for use, the request is denied. The token container may be refilled with tokens at a rate commensurate to the rate limit specified in the grant.

In some examples, the cryptographic key management service obtains data logs from various services provided by the computing resource service provider to determine a rate at which a particular client can submit requests to the cryptographic key management service to utilize a cryptographic key from the service to decrypt a customer's data. A customer of the computing resource service provider may access the cryptographic key management service to create a grant for the client. The cryptographic key management service may provide usage data regarding use of the cryptographic key to the customer to enable the customer to identify a historical rate at which a client submits requests to enable use of a cryptographic key or other usage patterns for the client. Based on this historical rate information or other usage data, a customer or the cryptographic key management service may identify a number of requests a client may submit over a period of time for utilizing the cryptographic key. This number of requests may be implemented in the grant and, as the client submits requests to the cryptographic key management service to utilize the cryptographic key to decrypt data, the cryptographic key management service may update the grant to reduce the number of available requests the client may make to the service to utilize the cryptographic key. If the number of available requests for the client is depleted, the cryptographic key management service may retire the grant. Thus, if the client submits another request to utilize the cryptographic key, the grant may no longer be available and the cryptographic key management service may deny the request.

In another example, in response to a request from a client to utilize a cryptographic key to perform a cryptographic operation, the cryptographic key management service uses the cryptographic key to decrypt data for the client, encrypts the data, and provides the encrypted data to the user to fulfill the request. The data may be encrypted after decryption using an encryption algorithm that is cryptographically weaker than the encryption algorithm that was used to encrypt the data before decryption. The client may be required to decrypt the encrypted data to obtain the requested data for its use. For instance, the cryptographic key management service may encrypt the data using a public cryptographic key of a cryptographic key pair. The cryptographic key management service may provide the encrypted data and the public cryptographic key to the client in response to its request, which may require the client to calculate the private cryptographic key to decrypt the encrypted data. The public cryptographic key may be used as input into an algorithm to compute the private cryptographic key that is used for decryption of the data.

Similarly, the cryptographic key management service may provide the decrypted data and a challenge to the client in response to its request to utilize the cryptographic key. The client may be required to complete the challenge and provide a response to the cryptographic key management service in a subsequent request to use the cryptographic key to perform a cryptographic operation, such as decrypting user data. The cryptographic key management service may receive the challenge response and determine whether the response is valid. If the response is valid, the cryptographic key management service may enable the client to utilize the cryptographic key for a cryptographic operation. However, if in the subsequent request the client does not provide a valid response to the challenge presented by the cryptographic key management service, the cryptographic key management service may deny the request from the client.

In this manner, a customer of a computing resource service provider or the cryptographic key management service may limit a client's utilization of a cryptographic key to perform cryptographic operations. In addition, the techniques described and suggested in this disclosure enable additional technical advantages. For instance, because the cryptographic key management service may evaluate data logs for users of the cryptographic keys to identify usage patterns and define rate limitations based on these usage patterns, the cryptographic key management service may proactively limit use of the cryptographic keys without customer interaction. Thus, the imposition of a rate limitation may be made rapidly.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of an environment 100 in which various embodiments can be implemented. In the environment 100, a user, through a client 102, may transmit a request to a cryptographic key management service 104 to utilize a cryptographic key 110 for a cryptographic operation. The cryptographic operation may include use of the cryptographic key 110 to decrypt data stored within one or more services 108 of a computing resource service provider. The cryptographic key management service 104 may include one or more computer systems that are used to create and control cryptographic keys that can be used to encrypt and decrypt data maintained by other computing resource services 108. For instance, a customer of a computing resource service provider may transmit a request to the cryptographic key management service 104 to create one or more cryptographic keys 110 that may be used to encrypt the customer's data stored within various computing resource services 108 provided by a computing resource service provider. The cryptographic key management service 104 may provision the requested cryptographic keys and utilize these cryptographic keys to encrypt the customer's data as specified in requests from the customer.

In an embodiment, a customer of the computing resource service provider can generate, through the cryptographic key management service 104, one or more grants 106 that can be used to regulate access to the customer's cryptographic keys 110. A grant 106 may specify an entity that is the principal of the grant 106, such as an identifier of a user 102, a group of users, a role that may be assumed by users, and the like that may have permission to utilize a cryptographic key 110. The grant 106 may further specify identifiers for principals that may have permission to retire the grant 106. Additionally, the grant 106 may identify the cryptographic key to which the grant 106 applies. Thus, if a client 102 submits a request to use a particular cryptographic key 110 in order to perform a cryptographic operation, the cryptographic management service 104 may determine whether there is a grant 106 available that is applicable to the request. For example, the cryptographic key management service 104 may evaluate the request to identify an identifier for the grant 106, which the service 104 can use to obtain the required grant 106 for the request. The cryptographic key management service 104 may evaluate the specified grant 106 to determine whether the requested operation is specified in an ordering of operations that are permitted by the grant 106 or whether the use of the cryptographic key 110 is subject to one or more constraints, as specified in the grant 106. If the client 102, based at least in part on the grant 106, is not authorized to submit such a request to cause the service 104 to perform the cryptographic operation, the cryptographic key management service 104 may deny the client's request to utilize the cryptographic key 110.

If the cryptographic key management service 104 determines, based at least in part on the grant 106, that the client is authorized to request use the requested cryptographic key 110, the cryptographic key management service 104 may determine whether the grant 106 specifies one or more usage limitations for the cryptographic key 110. For instance, in an embodiment, a customer can generate a grant 106 that specifies a usage limitation for one or more principals such that the one or more principals may utilize the cryptographic key 110 under certain circumstances. For instance, the customer may specify, in the grant 106, a maximum number of times that a principal may utilize the target cryptographic key 110 before the grant 106 expires and can no longer be used in response to client requests to utilize the cryptographic key 110. As the client submits requests to utilize the cryptographic key 110, the cryptographic key management service 104 may track the client's requests for use of the cryptographic key 110 and determine whether the client has reached the maximum number of requests specified in the grant 106. If the maximum number of requests has been reached, the cryptographic key management service 104 may expire the grant 106 such that the grant 106 is no longer available in response to future requests from the client 102. Thus, if the client 102 submits a new request to utilize the cryptographic key 110, the cryptographic key management service 104 may deny the request, as the grant 106 is no longer available for use.

In some embodiments, a customer of the computing resource service provider implements, through a grant 106, a limitation to the rate at which principals may submit requests to utilize a cryptographic key 110. The cryptographic key management service 104 may implement, based at least in part on the rate limitation specified in the grant 106, a token data container, which may include a number of tokens that may be required to utilize the cryptographic key 110 to decrypt data maintained by other computing resource services 108. A token data container, or token container, may be a logical data container that is used to ensure that incoming requests to utilize a cryptographic key conforms to defined limits on use, as specified in a grant 106 or as defined by the cryptographic key management service 104. For instance, in response to a request from the client 102 to utilize the cryptographic key 110, the cryptographic key management service 104 may evaluate the grant 106 and determine that a rate limitation has been applied. In response to this determination, the cryptographic key management service 104 may identify the token container that corresponds to the grant 106 and determine whether the token container has a token available for use. If the token container has a token available for use, the cryptographic key management service 104 may obtain the token from the token container and enable use of the cryptographic key 110 to perform the requested cryptographic operation. However, if the token container does not have a token available for use, the cryptographic key management service 104 may deny the client's request. The tokens for the token container may be replenished at the rate specified in the grant 106. Thus, the token container may be used to impose the rate limitation specified in the grant 106.

In an alternative embodiment, in response to the request from the client 102 to utilize the cryptographic key to perform a cryptographic operation, the cryptographic key management service 104 may transmit a challenge to the client 102 that is to be completed successfully in order to enable use of the cryptographic key 110 to perform the cryptographic operation. For instance, the client 102 may be required to provide a challenge response to the cryptographic key management service 104 to enable use the cryptographic key 110. The cryptographic key management service 104 may evaluate the challenge response to determine whether it is valid and whether it is correct. If the challenge response is valid and correct, the cryptographic key management service 104 may enable use of the cryptographic key 110. The challenge may include a Completely Automated Public Turing test to tell Computers and Humans Apart (CAPTCHA) challenge, a set of cryptographic operations that are to be performed by the client 102 to compute a value that can be verified by the cryptographic key management service 104, or any other operation based at least in part on one or more proof-of-work protocols (e.g., challenge-response, solution-verification, etc.).

As an illustrative example, the cryptographic key management service 104 may use the cryptographic key to decrypt data for the client 102. The cryptographic key management service 104 utilizes a hash-based key derivation function to encrypt the data using a second cryptographic key. The second cryptographic key may be calculated by generating a random value, hashing the random number a particular number of times, and using the resulting output of the hash function as the second cryptographic key. The cryptographic key management service 104 may provide the random value, the encrypted data, and the number of hashing iterations required to calculate the second cryptographic key from the random value selected by the cryptographic key management service 104. The client 102 may perform the operations required to calculate the second cryptographic key, which it may use to decrypt the data.

In an embodiment, the cryptographic key management service 104 utilizes RSA or any other public cryptographic key cryptosystem to encrypt the data decrypted using the cryptographic key 110 in response to a request from the client 102 to utilize the cryptographic key 110. For instance, in response to the request from the client 102 to utilize the cryptographic key 110, the cryptographic key management service 104 may use the cryptographic key 110 to decrypt the data and may provide, to the client 102, the encrypted data and a public cryptographic key utilized to encrypt the data. In response to receiving the encrypted data and the public cryptographic key from the cryptographic management service 104, the client 102 may solve a factoring problem, to calculate the private cryptographic key necessary to decrypt the encrypted data. For instance, the client 102 may utilize the public cryptographic key and a ciphertext (e.g., the encrypted data) as input into an algorithm to solve the factoring problem and obtain the private cryptographic key. In some embodiments, the cryptographic key management service 104 can determine the amount of work to be performed by the client 102 by increasing or decreasing the size of the factoring problem that is to be performed in order to calculate the private cryptographic key. The amount of work may be determined based at least in part on customer input through the grant 106 or based at least in part on usage data from the one or more other services 108 and a client's deviation from a historical usage rate calculated based at least in part on the usage data.

The cryptographic key management service 104 may utilize other mechanisms to regulate the rate at which a client 102 is able to have requests to utilize the cryptographic key 110 to decrypt data by the one or more other computing resource services 108 fulfilled. For instance, in an embodiment, the cryptographic key management service 104 enables use of the cryptographic key 110 and provides, to the client 102, a challenge which the client 102 is to generate a response in order to have future requests to utilize the cryptographic key 110 be fulfilled. The challenge may be similar to those described above. In a subsequent request to the cryptographic key management service 104, the client 102 may provide a response to the challenge. The cryptographic key management service 104 may evaluate the response to the challenge to determine whether it is valid and correct. If the challenge response is valid and correct, the cryptographic key management service 104 may fulfill the request by enabling use of the cryptographic key 110. However, if the challenge response is not valid or is not correct, the cryptographic key management service 104 may perform one or more remedial actions. For instance, the cryptographic key management service 104 may deny the request. Alternatively, the cryptographic key management service 104 may utilize any of the other methods described above to increase the amount of work required by the client 102 to utilize the cryptographic key 110.

Figure 2:
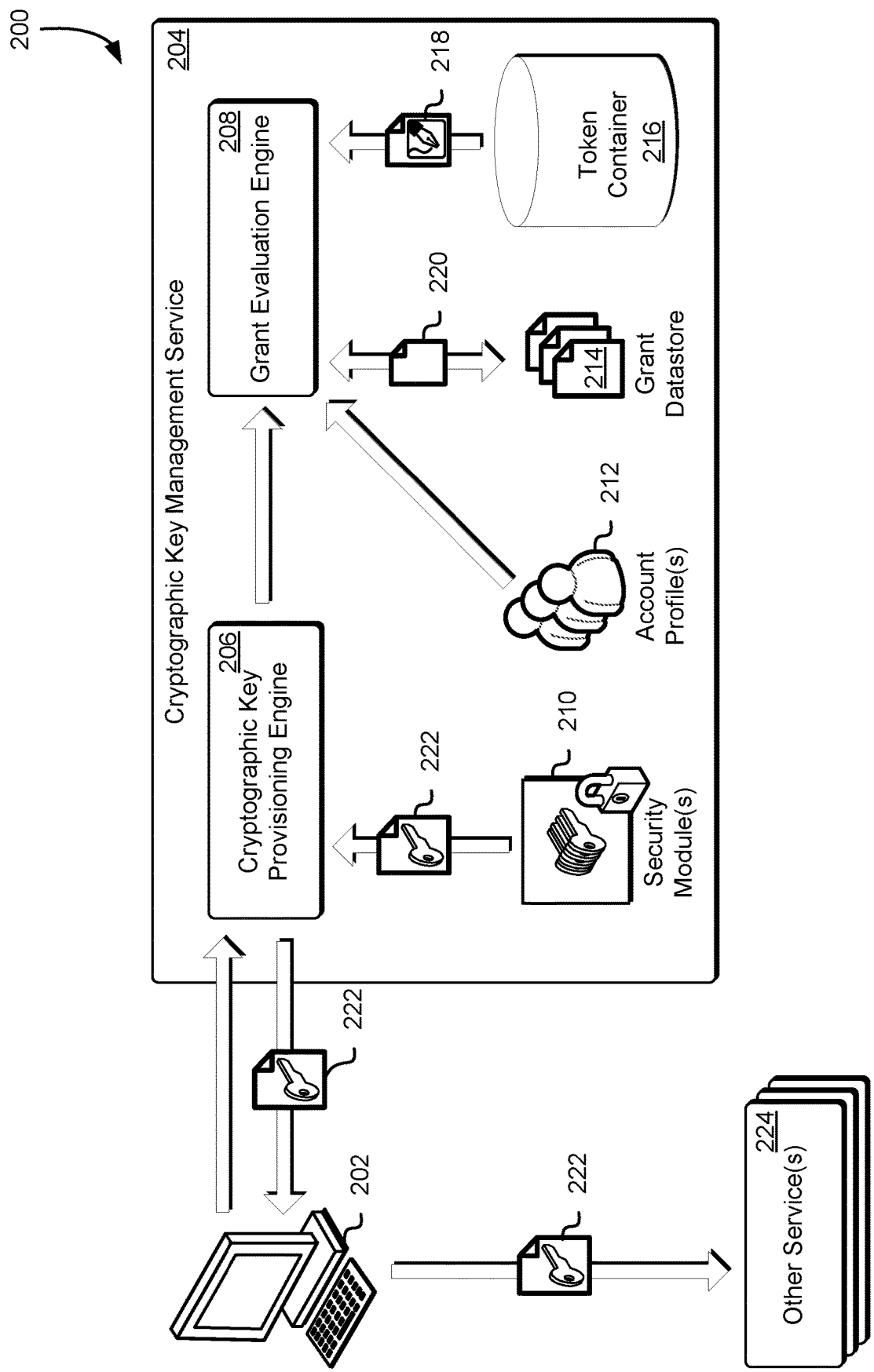
FIG. 2 shows an illustrative example of an environment in which a cryptographic key management service applies one or more rate-limiting methods to control the rate at which cryptographic keys are utilized in accordance with at least one embodiment.

As described above, a customer of a computing resource service provider may impose, through a grant applicable to requests from clients to utilize a cryptographic key for performance of a cryptographic operation, a limitation on the rate at which the cryptographic key is utilized. Alternatively, the cryptographic key management service may utilize cryptographic key usage data from various services to obtain historical rate information for a particular cryptographic key. This information may be used to impose rate limitations on users of the cryptographic key. Accordingly, FIG. 2 shows an illustrative example of an environment 200 in which a cryptographic key management service 204 applies one or more rate-limiting methods to control the rate at which cryptographic keys 222 can be utilized in accordance with at least one embodiment. In the environment 200, a client 202 may submit a request to a cryptographic key management service 204 to utilize a cryptographic key 222 to perform one or more cryptographic operations. For instance, the client 202 may request that the cryptographic key management service 204 utilize a cryptographic key 222 to decrypt data protected using the cryptographic key 222. The data may be stored within one or more services 224 of the computing resource service provider.

The request from the client 202 may be processed by a cryptographic key provisioning engine 206 of the cryptographic key management service 204. The cryptographic key provisioning engine 206 may include one or more computer systems of the cryptographic key management service 204 or an application installed on a computer system of the cryptographic key management service 204 that processes incoming requests to utilize cryptographic keys 222 and enables use of the cryptographic keys 222 based at least in part on a determination from a grant evaluation engine 208. For instance, in response to a request from the client 202 to utilize a cryptographic key 222, the cryptographic key provisioning engine 206 may transmit an identifier for an applicable grant 220, as well as other information that may be used to identify the principal that is subject to the grant 220, to the grant evaluation engine 208 to obtain a determination as to whether the client 202 is authorized to submit requests for use of the cryptographic key 222 and whether such requests are subject to one or more rate limitations as specified in the applicable grant 220.

The grant evaluation engine 208 may include one or more computer systems of the cryptographic key management service 204 or an application of the cryptographic key management service 204 that utilizes a grant 220 applicable to an incoming request to utilize a cryptographic key 222 to decrypt data from one or more computing resource services 224 to determine whether the client 202 is authorized to submit requests to utilize the cryptographic key 222. The grant evaluation engine 208 may obtain information from the cryptographic key provisioning engine 206, as well as other information from an account profile datastore 212 (e.g., user information, grants associated with the user account, etc.) and may access a grant datastore 214 to obtain one or more grants 220 that may be applicable to the request. For instance, the client 202 may provide a principal identifier, an identifier of the cryptographic key 222, an identifier for applicable grants 220. The grant evaluation engine 208 may utilize the provided information and information from the account profile datastore 212 to identify the one or more grants 220 applicable to the request from the grant datastore 214 and may evaluate these one or more grants 220 to determine whether the client 202 is authorized to submit requests to utilize the cryptographic key 222.

In an embodiment, a grant 220 specifies one or more usage limitations that may be imposed for using the cryptographic key 222. For instance, the grant 220 may specify a rate limit for using the cryptographic key 222 for cryptographic operations. The rate limit specified in the grant 220 may be implemented as a token container throttling system, whereby the cryptographic key management service 204 may maintain a token container 216 that includes a limited number of tokens 218 available for requests to utilize the cryptographic key 222. The token container 216 may be specific to a particular cryptographic key 222 or particular grant 220 provided by the customer. The number of tokens 218 in the token container 216 and the rate at which tokens 218 are replenished within the token container 216 may be based at least in part on the rate limit specified in the grant 220.

The grant evaluation engine 208 may access the token container 216 to determine whether there is a token 218 available for enabling use of the cryptographic key 222 to perform the requested cryptographic operation. If the grant evaluation engine 208 determines that no tokens 218 are available within the token container 216, the grant evaluation engine 208 may transmit a notification to the cryptographic key provisioning engine 206 indicating that the request may not be fulfilled. In response to the notification, the cryptographic key provisioning engine 206 may deny the request from the client 202. Alternatively, the cryptographic key provisioning engine 206 may wait a period of time relative to the rate limit imposed in the grant 220 to resubmit the information to the grant evaluation engine 208. Thus, the request from the client 202 need not be denied if no tokens 218 are available in the token container 216, as the cryptographic key management service 204 may wait until the one or more tokens 218 are replenished to deduct a token 218 for use of the cryptographic key 222.

If the notification from the grant evaluation engine 208 indicates that the request from the client 202 can be fulfilled, the cryptographic key provisioning engine 206 may access a security module 210 to obtain the cryptographic key 222. The security module 210 is a physical computing device or other computing device of the cryptographic key management service 204 that is used to manage cryptographic keys on behalf of customers of the computing resource service provider. For instance, in response to a request from a customer to provision a new cryptographic key for encrypting the customer's data, the cryptographic key management service 204 may generate the cryptographic key 222 and store the cryptographic key 222 within the security module 210. The security module 210 can be a hardware security module (HSM), which can include a plug-in device for a cryptographic key management service 204 computer system or an external device that attaches to the computer system. The HSM may utilize various mechanisms to provide tampering resistance and may provide notifications to the cryptographic key management service 204 if an attempt to tamper with a cryptographic key is detected. Other security appliances that are not classified as hardware security modules may be used as the security module 210 to protect the cryptographic keys stored therein. The cryptographic key 222 is not accessible by the customer or any other users of the cryptographic key management service 204. The cryptographic key provisioning engine 206 may obtain the cryptographic key 222 from the security module 210 and may use the cryptographic key 222 to perform the cryptographic operation specified by the client 202 to fulfill the request. For instance, the cryptographic key provisioning engine 206 may access the one or more other services 224 on behalf of the client 202 and utilize the cryptographic key 222 to decrypt data from the one or more other services 224 as specified in the request from the client 202. The cryptographic key management service 204 may provide the decrypted data to the client 202 to fulfill the request.

In some embodiments, the cryptographic key provisioning engine 206, in response to the request from the client 202 to enable use of the cryptographic key 222 to decrypt data from the one or more other services 224, may transmit a challenge to the client 202 which the client 202 may be required to complete in order to enable use of the cryptographic key 222. For instance, if the grant 220 specifies that the usage of the cryptographic key 222 is subject to one or more rate limitations, the cryptographic key provisioning engine 206 may transmit a challenge to the client 202 which may need to be completed in order to enable use of the cryptographic key 222. The challenge may include a CAPTCHA challenge, a set of cryptographic operations that are to be performed by the client 202 to compute a value that can be verified by the cryptographic key provisioning engine 206, or any other operation based at least in part on one or more proof-of-work protocols. The cryptographic key provisioning engine 206 may evaluate the response from the client 202 to determine whether the challenge response from the client 202 is valid and correct. If so, the cryptographic key provisioning engine 206 may enable the use of the cryptographic key 222 to perform the requested one or more cryptographic operations. However, if the challenge response is not valid, the cryptographic key provisioning engine 206 may deny the request or submit another challenge to the client 202.

In an alternative embodiment, in response to the request from the client 202, the cryptographic key provisioning engine 206 utilizes a second cryptographic key to encrypt data decrypted using the cryptographic key 222, which the cryptographic key provisioning engine 206 provides to the client 202. The encryption of the data using the second cryptographic key may be cryptographically weaker than the original encryption of the data using the cryptographic key 222. For example, encrypting the data with the cryptographic key 222 may result in encrypted data that may be computationally difficult or practically impossible to decrypt without use of the cryptographic key 222. However, encryption of the data using the second cryptographic key may be weaker, such that the client 202 may utilize information provided by the cryptographic key management service 204 to decrypt the encrypted data without being provided with the second cryptographic key. For instance, the cryptographic key provisioning engine 206 may use a hash-based key derivation function to encrypt the data decrypted using the cryptographic key through use of the second cryptographic key. The second cryptographic key may be calculated by generating a random value, hashing the random value a particular number of times, and using the resulting output of the hash function as the second cryptographic key. The cryptographic key provisioning engine 206 may provide the random value, the encrypted data, and the number of hashing iterations required to calculate the second cryptographic key from the random value selected by the cryptographic key provisioning engine 206. The client 202 may perform the operations required to calculate the second cryptographic key, which it may use to decrypt the data.

The cryptographic key provisioning engine 206 may also, based at least in part on the limitations specified in the grant 220 or as specified by the customer, provide a challenge to the client 202 in addition to enabling use of the cryptographic key 222 to perform one or more cryptographic operations. Similar to the challenges described above, the client 202 may be required to provide a valid response to the challenge from the cryptographic key provisioning engine 206. However, the client 202 may be required to provide the challenge response when it submits another request to the cryptographic key management service 204 to utilize the cryptographic key 222 to perform additional cryptographic operations. If the client 202 is unable to provide a valid response to the challenge from the cryptographic key provisioning engine 206, the cryptographic key provisioning engine 206 may deny the client's request or provide a different challenge to the client 202 that is to be completed successfully to enable use of the cryptographic key 222. The cryptographic key provisioning engine 206 may maintain a reference to the challenge provided to the client 202 within the user account in the account profile datastore 212.

In another embodiment, the cryptographic key provisioning engine 206 can use one or more public cryptographic key cryptosystems, such as RSA, to encrypt the data decrypted using the cryptographic key 222 in response to a request from the client 202 to enable use of the cryptographic key 222 for a cryptographic operation. For instance, in response to the request from the client 202, the cryptographic key provisioning engine 206 may provide, to the client 202, the encrypted data previously decrypted using the cryptographic key 222 and a public cryptographic key utilized to encrypt the data. In response to receiving the encrypted data and the public cryptographic key from the cryptographic key provisioning engine 206, the client 202 may solve a factoring problem to calculate the private cryptographic key necessary to decrypt the encrypted data. For instance, the client 202 may use the public cryptographic key and the encrypted data as input into an algorithm to solve the factoring problem and obtain the private cryptographic key.

In some embodiments, a customer of the cryptographic key management service 204 submits a request to the service 204 to encrypt data using the cryptographic key 222. Additionally, through the request, the customer may specify that additional authenticated data (AAD) is to be included in the encryption process. Alternatively, the cryptographic key management service 204 may utilize AAD automatically. The output of the encryption process may include the encrypted data, a message authentication code (MAC), and the AAD. In some instances, the output of the encryption process may include ciphertext and the MAC. In an embodiment, the grant 220 is generated to include a condition that specifies that if the requester (e.g., client 202) provides information in its request to enable use of the cryptographic key 222 that is specified in the AAD, a rate limitation may apply to the request. Thus, the cryptographic key provisioning engine 206 may evaluate the information provided in the request from the client 202 against the AAD for the encrypted data to determine whether a rate limitation applies to the client 202.

In some instances, rate limits may be placed on encryption contexts, where encrypted data can be cryptographically bound to aspects of the encryption contexts. As an illustrative example, the AAD can be used to cryptographically bind a tag on the data to the encrypted data (e.g., a purpose of the data, etc.). The grant 220 can specify conditions on encryption context. For example, if the grant 220 specifies that cryptographic operations may be performed on encrypted data tagged with a particular identifier in the AAD at a particular rate. The AAD may be used to ensure that entities cannot re-tag the data without affecting the MAC that results from the encryption process. The AAD may be cryptographically bound to the encrypted data by way of the MAC resulting from an authenticated encryption mode of a cipher, such as AES-GCM.

Figure 3:
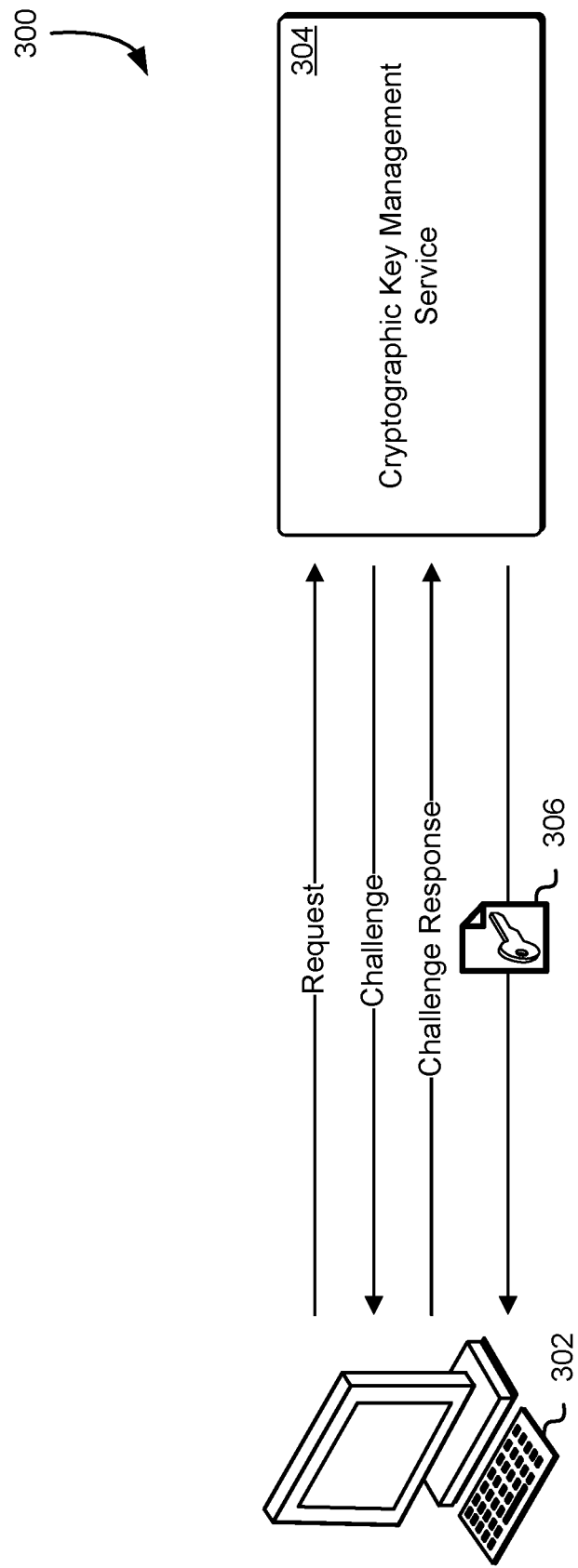
FIG. 3 shows an illustrative example of an environment in which a cryptographic key management service enables use of a cryptographic key based at least in part on successful completion of a challenge presented to a requesting user in accordance with at least one embodiment.

As noted above, if the cryptographic key management service determines, based at least in part on a grant applicable to a request from a client to enable use of a cryptographic key for use in one or more cryptographic operations, that use of the cryptographic key is subject to one or more usage rate limitations, the cryptographic key management service may submit a challenge to the client, which the client may be required to complete successfully in order to enable use of the cryptographic key to fulfill the request. Accordingly, FIG. 3 shows an illustrative example of an environment 300 in which a cryptographic key management service 304 enables use of a cryptographic key based at least in part on successful completion of a challenge presented to a requesting client 302 in accordance with at least one embodiment. In the environment 300, a client 302 may submit, on behalf of a user of the client 302, a request to the cryptographic key management service 304 to utilize a cryptographic key to perform one or more cryptographic operations, such as decrypting data from one or more computing resource services that was encrypted using the cryptographic key. The cryptographic key may be stored by the cryptographic key management service 304 using a security module of the service 304.

In response to the request, the cryptographic key management service 304 may obtain one or more grants applicable to the request. The one or more grants may specify whether the client 302 is authorized to utilize the cryptographic key to perform one or more operations. Further, the one or more grants may specify a usage rage limitation for the cryptographic key. For instance, the one or more grants may specify that the client 302 is authorized to utilize the cryptographic key a certain number of times within a particular interval of time. Alternatively, the one or more grants may specify that the client 302 is only allowed to utilize the cryptographic key a limited number of times, after which the grant may expire. If the cryptographic key management service 304 determines, based at least in part on the one or more grants, that the client 302 is subject to one or more usage rate limitations (e.g., the client 302 has exceeded its usage rate limitation, has exceeded the maximum number of uses, etc.), the cryptographic key management service 304 may generate a challenge for the client 302, which the client 302 may be required to complete successfully in order to enable use of the cryptographic key for fulfillment of the request. The difficulty of the challenge may be based at least in part on the usage rate limitations imposed through the one or more grants.

The challenge may include a CAPTCHA challenge, a set of cryptographic operations that are to be performed by the client to compute a value that can be verified by the cryptographic key management service 304, or any other operation based at least in part on one or more proof-of-work protocols. In response to the challenge from the cryptographic key management service 304, the client 302 may perform one or more operations to generate a challenge response, which it provides to the cryptographic key management service 304. For instance, if the cryptographic key management service 304 provides a CAPTCHA challenge to the client 302, a user of the client 302 may provide, through the client 302, the plaintext or other data specified in the CAPTCHA challenge as a challenge response. Alternatively, the client 302 may perform various cryptographic operations or utilize various algorithms to generate a value that can be easily verified by the cryptographic key management service 304. For instance, the challenge from the service may include an input value and an expected value that the client 302 must produce through use of an algorithm and another input value to the algorithm. The client 302 may use the input value from the service 304 and iterate through different values to provide inputs to the algorithm that may be used to calculate the expected value. If the client 302 obtains the expected value, the client 302 may provide, as the challenge response, the input value identified by the client 302. The cryptographic key management service 304 may use the input value that it provided, as well as the input value determined by the client 302, as inputs to the algorithm to determine if the expected value is obtained. If it is, then the service 304 may determine that the client 302 has successfully completed the challenge.

If the client 302 successfully completes the challenge (e.g., provides a valid challenge response to the cryptographic key management service 304), the cryptographic key management service 304 may utilize the cryptographic key to decrypt the data 306 and may provide the data 306 to the client 302. However, if the client 302 is unable to provide a valid challenge response to the cryptographic key management service 304, the cryptographic key management service 304 may deny the request. Alternatively, the cryptographic key management service 304 may allow the client 302 to continue calculating challenge responses. After a period of time has elapsed without a successful challenge response, the cryptographic key management service 304 may cause the request to time out, issue a new challenge to the client 302, or deny the request.

In an embodiment, if the client 302 successfully completes the challenge, the cryptographic key management service 304 provides the requested data 306 to the client 302 at a normal or expedited rate (i.e., more quickly than if the client 302 did not prove successful completion of the challenge). For instance, the cryptographic key management service 304 may provide the decrypted data 306 to the client 302 through the established connection without throttling the established connection to reduce the rate at which data is transmitted over the established connection. However, if the client 302 does not provide a valid challenge response to the cryptographic key management service 304, the service 304 may deny the request or transmit the decrypted data 306 to the client 302 at a slower rate, such as through reducing the rate at which data is transmitted over the established connection with the client 302.

Figure 4:
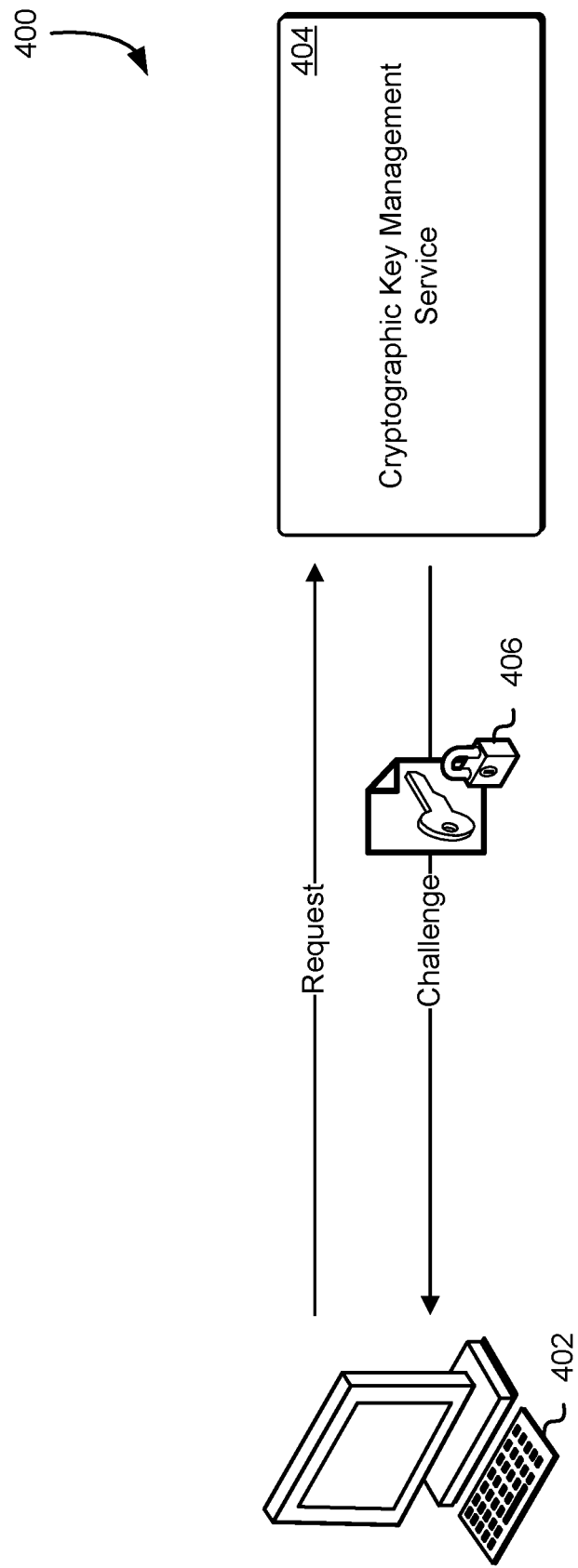
FIG. 4 shows an illustrative example of an environment in which a cryptographic key management service provides data encrypted using a second cryptographic key to a client to enable the client to decrypt the data in accordance with at least one embodiment.

In some embodiments, the cryptographic key management service uses a second cryptographic key to encrypt the data decrypted using the cryptographic key provisioned by the customer, which the service may provide to the client in response to its request to utilize the cryptographic key to perform one or more cryptographic operations. The client may be required to calculate the second cryptographic key that can be used to decrypt the data. Accordingly, FIG. 4 shows an illustrative example of an environment 400 in which a cryptographic key management service 404 provides data 406 encrypted using a second cryptographic key to a client 402 to enable the client 402 to decrypt the data in accordance with at least one embodiment. Similar to the environment 300 described above, in the environment 400, a client 402 may submit a request to the cryptographic key management service 404 to utilize a cryptographic key to perform one or more cryptographic operations. In response to the request, the cryptographic key management service 404 may obtain one or more grants applicable to the request. The one or more grants may specify a usage rage limitation for the cryptographic key. If the cryptographic key management service 404 determines, based at least in part on the one or more grants, that the client 402 is subject to one or more usage rate limitations, the cryptographic key management service 404 may decrypt the requested data using the cryptographic key and utilize a hash-based key derivation function to generate a second cryptographic key that is used to encrypt the data. The second cryptographic key may be calculated by generating a random value, hashing the random value a number of times, and using the resulting output of the hash function as the second cryptographic key. The number of times that the random value is hashed may be determined based at least in part on the rate limitations imposed on the client 402 by virtue of the one or more grants applicable to the request. For instance, if the client 402 has deviated from the usage rate limit by a minimal amount, the number of hash operations performed may also be minimal. However, as the client 402 deviates further from the usage rate limitation, the cryptographic key management service 404 may perform additional hashing operations to obtain the second cryptographic key.

In response to the request from the client 402, the cryptographic key management service 404 may provide the encrypted data 406, the random value used as input to the hash-based key derivation function, and the number of hashing iterations required to calculate the second cryptographic key to the client 402. The client 402 may perform the necessary hashing iterations using the hash-based key derivation function to obtain the second cryptographic key. If client 402 successfully obtains the second cryptographic key as output to the hash-based key derivation function, the client 402 may use the second cryptographic key to decrypt the encrypted data 406.

In an embodiment, the cryptographic key management service 404 utilizes one or more public cryptographic key cryptosystems, such as RSA, to encrypt the requested data in response to the client's request to use the cryptographic key for a cryptographic operation. For example, if the cryptographic key management service 404 utilizes RSA, the cryptographic key management service 404 may select prime numbers having a size based at least in part on the deviation, by the client 402, from the usage rate limitations specified in the one or more grants. For instance, if the deviation from the usage rate limitations increases, the size of the prime numbers may increase proportionally. These prime numbers may be used to generate a cryptographic key pair for encrypting the data requested by the client 402.

In response to the request from the client 402, the cryptographic key management service 404 may provide the encrypted data 406 and a public cryptographic key used to encrypt the data. The cryptographic key management service 404 may discard the private cryptographic key. In response to receiving the encrypted data 406 and the public cryptographic key, the client 402 may solve the RSA factoring problem to calculate the private cryptographic key necessary to decrypt the encrypted data 406. For instance, the client 402 may utilize the public cryptographic key and the encrypted data 406 as input into an algorithm to solve the factoring problem and obtain the private cryptographic key. The client 402 may use the private cryptographic key obtained through use of the algorithm to decrypt the encrypted data 406. However, if the user 402 is unable to calculate the private cryptographic key, the client 402 may be unable to decrypt the encrypted data 406 and may thus be unable to obtain the requested data.

Figure 5:
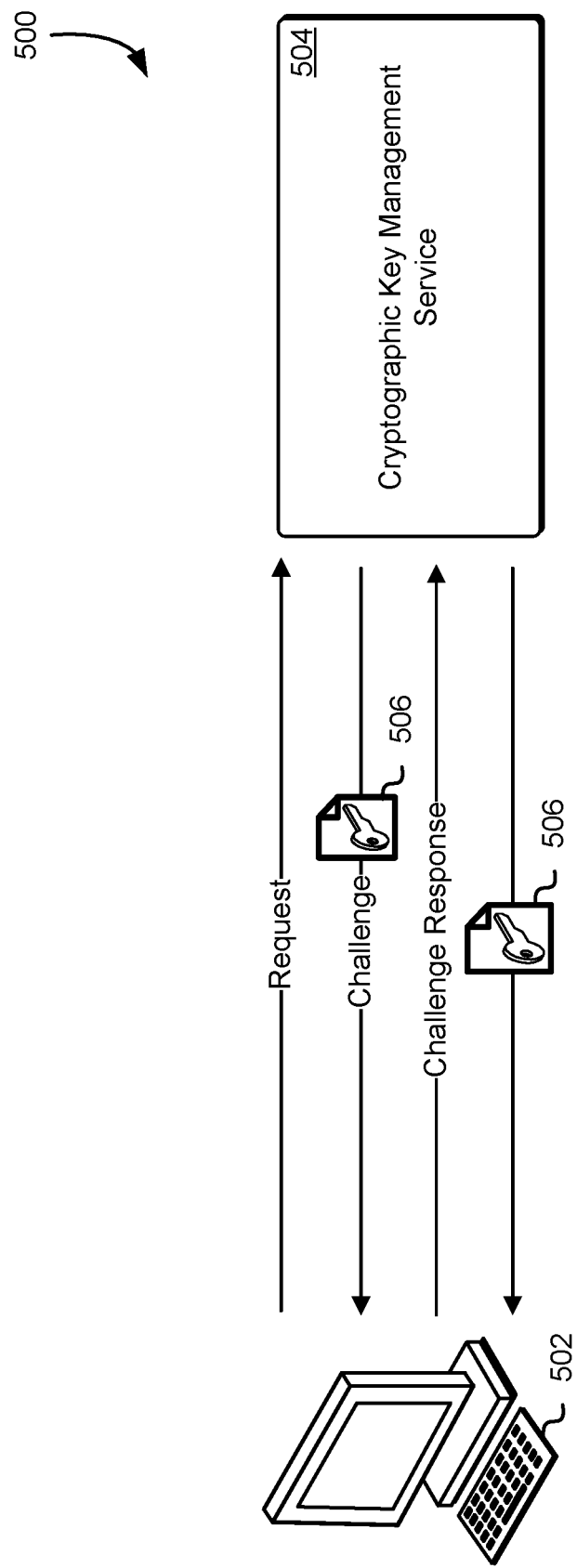
FIG. 5 shows an illustrative example of an environment in which a cryptographic key management service requires that a client provide a valid challenge response to enable use of a cryptographic key after an initial request to enable use of the cryptographic key is fulfilled in accordance with at least one embodiment.

In an alternative embodiment, the cryptographic key management service, in response to a request from the client to utilize the cryptographic key to perform one or more cryptographic operations, provides a challenge to the client and enables use of the cryptographic key to perform the one or more cryptographic operations. If the client submits a later request to utilize the cryptographic key to perform additional cryptographic operations, the client may be required to provide a challenge response that is valid in order to enable use the cryptographic key to perform the additional cryptographic operations. Accordingly, FIG. 5 shows an illustrative example of an environment 500 in which a cryptographic key management service 504 requires that a client 502 provide a valid challenge response to enable use of a cryptographic key after an initial request to enable use of the cryptographic key is fulfilled in accordance with at least one embodiment.

In the environment 500, a client 502 submits a request to the cryptographic key management service 504 to utilize a cryptographic key to perform one or more cryptographic operations. Similar to the environments 300 and 400 described above, in response to the request, the cryptographic key management service 504 may obtain one or more grants applicable to the request. The one or more grants may specify a usage rage limitation for the cryptographic key. If the cryptographic key management service 504 determines, based at least in part on the one or more grants, that the client 502 is subject to one or more usage rate limitations, the cryptographic key management service 504 may generate a challenge for the client 502, which the client 502 may be required to complete successfully in order to enable use of the cryptographic key for subsequent requests. The difficulty of the challenge may be based at least in part on the usage rate limitations imposed through the one or more grants.

The cryptographic key management service 504, in response to the request, may enable use of the cryptographic key to perform the one or more cryptographic operations to obtain data 506 that is provided to the client 502 to fulfill the request. Additionally, the cryptographic key management service 504 may provide the client 502 with a challenge that the client 502 may be required to provide a challenge response for in a subsequent request to the cryptographic key management service 504 to utilize the cryptographic key. The challenge may include a CAPTCHA challenge, a set of cryptographic operations that are to be performed by the client to compute a value that can be verified by the cryptographic key management service 504, or any other operation based at least in part on one or more proof-of-work protocols.

The client 502 may submit a new request to the cryptographic key management service 504 to utilize the cryptographic key to perform one or more new cryptographic operations. The cryptographic key management service 504 may access a user profile to determine whether a previous challenge was issued to the client 502. If so, the cryptographic key management service 504 may prompt the client 502 to provide a challenge response to the challenge issued to it by the cryptographic key management service 504. Alternatively, the client 502 may provide the challenge response in the request to the cryptographic key management service 504 to utilize the cryptographic key. The cryptographic key management service 504 may evaluate the challenge response to determine whether it is valid. If the challenge response is not valid, the cryptographic key management service 504 may deny the request to utilize the cryptographic key. However, if the challenge response is valid, the cryptographic key management service 504 may utilize the cryptographic key to perform the one or more new cryptographic operations, such as decrypting the data 506 that can be provided to the client 502 to fulfill the new request. In some embodiments, the cryptographic key management service 504 evaluates the one or more grants applicable to this new request to determine whether the client 502 is still subject to the usage rate limitations specified therein. If so, the cryptographic key management service 504 may generate a new challenge for the client 502, which the client may be required to complete prior to enabling use of the cryptographic key for additional cryptographic operations. However, if the client 502 is not impacted by the usage rate limitations, or the client 502 conforms to the usage rate limitations specified in the one or more grants, the cryptographic key management service 504 may enable use of the cryptographic key 506 without providing an additional challenge to the client 502.

In an embodiment, if the client 502 successfully completes the challenge, the cryptographic key management service 504 provides the requested data 506 to the client 502 in response to the second request to obtain the data 506 at a normal or expedited rate (i.e., faster than it provides the requested data if the client does not prove successful completion of the challenge). For instance, the cryptographic key management service 504 may provide the decrypted data 506 to the client 502 through the established connection without throttling the established connection to reduce the rate at which data is transmitted over the established connection. However, if the client 502 does not provide a valid challenge response to the cryptographic key management service 504, the service 504 may deny the second request to obtain the data 506 or transmit the decrypted data 506 to the client 502 at a slower rate, such as through reducing the rate at which data is transmitted over the established connection with the client 502.

Figure 6:
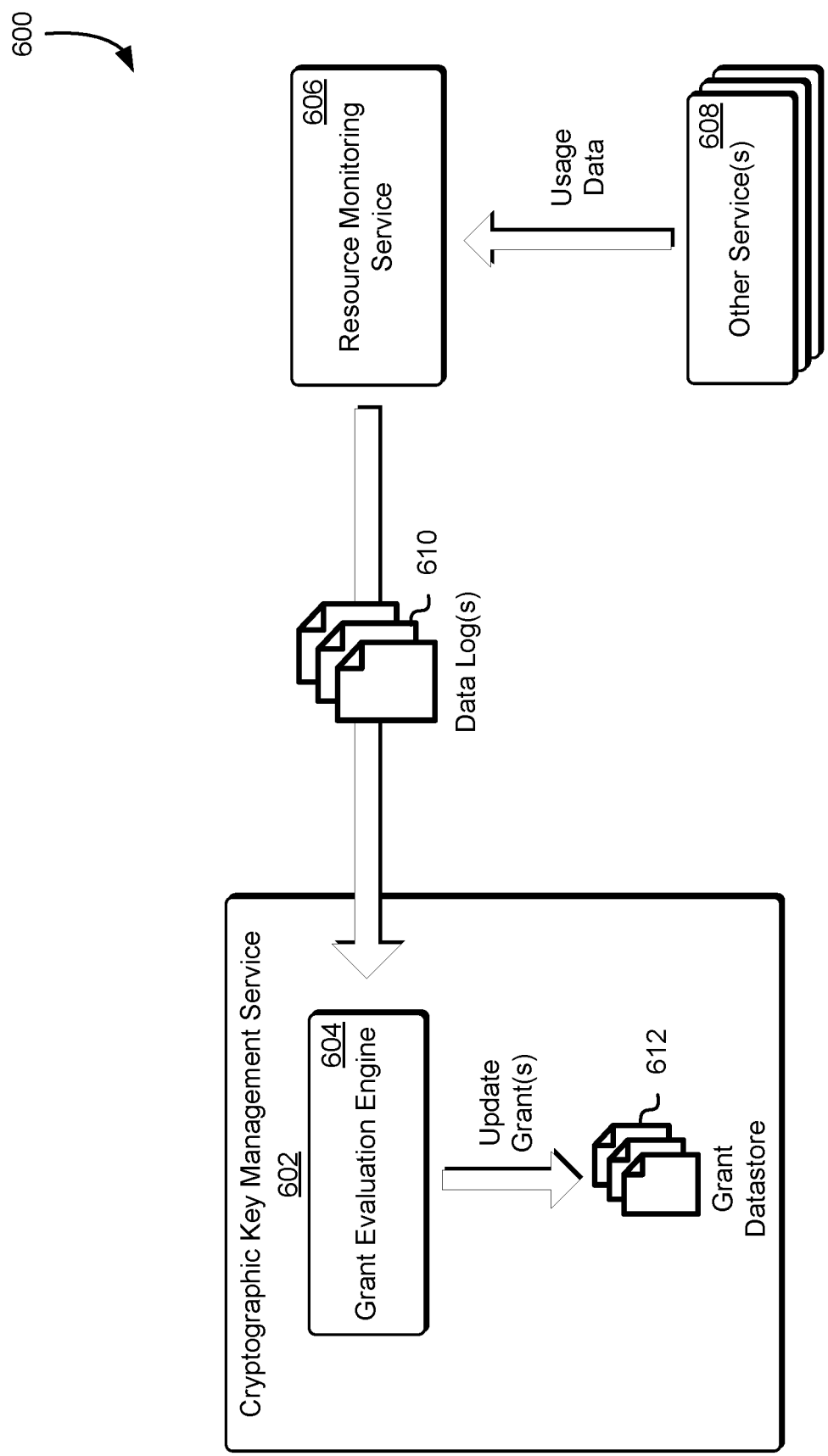
FIG. 6 shows an illustrative example of an environment in which a cryptographic key management service uses data logs from one or more computing resource services to determine whether to apply one or more rate limitations to users of cryptographic keys in accordance with at least one embodiment.

As noted above, the cryptographic key management service may obtain usage data logs from one or more computing resource services to determine a historical usage rate of cryptographic keys to decrypt data maintained by the one or more computing resource services. The usage data logs may be generated by a resource monitoring service, which may aggregate usage data from the one or more computing resource services according to the use of cryptographic keys maintained by the cryptographic key management service. The cryptographic key management service may utilize the data logs to impose, through grants, usage rate limitations for specific users and cryptographic keys maintained by the service. Accordingly, FIG. 6 shows an illustrative example of an environment 600 in which a cryptographic key management service 602 uses data logs 610 from one or more computing resource services 608 to determine whether to apply one or more rate limitations to users of cryptographic keys in accordance with at least one embodiment.

In the environment 600, a resource monitoring service 606 obtains usage data from one or more computing resource services 608 provided by a computing resource service provider. The usage data may specify instances in which cryptographic keys are used to decrypt data managed by the one or more computing resource services 608. The usage data may specify an identifier of the user that requested use, through a client, of a cryptographic key to decrypt data, an identifier of the cryptographic key used to decrypt the data, a timestamp indicating a time at which the data was decrypted, and the like. The one or more other services 608 may provide this usage data to the resource monitoring service 606 periodically or in response to detection of such operations performed on behalf of a user of the one or more other services 608.

The resource monitoring service 606 may include one or more computer systems that obtain usage data from one or more computing resource services 608 and aggregates the usage data according to various parameters. For instance, the resource monitoring service 606 may aggregate the usage data based at least in part on the user identifiers corresponding to users that enabled, through clients, use of cryptographic keys from the cryptographic key management service 602 to decrypt data from these one or more services 608. Additionally, the resource monitoring service 606 may aggregate the usage data based at least in part on corresponding identifiers for the cryptographic keys used to decrypt data from the one or more services 608. The resource monitoring service 606 may utilize the aggregated usage data to generate one or more data logs 610, which may be provided to the cryptographic key management service 602. For instance, the grant evaluation engine 604 of the cryptographic key management service 602 may submit a request to the resource monitoring service 606 to obtain the one or more data logs 610. Alternatively, the resource monitoring service 606 may provide the one or more data logs 610 to the grant evaluation engine 604 automatically.

The grant evaluation engine 604 may evaluate the one or more data logs 610 from the resource monitoring service 606 to identify usage rate information for users of the cryptographic keys maintained by the cryptographic key management service 602 and for the cryptographic keys themselves. Through evaluation of the one or more data logs 610, the grant evaluation engine 604 may identify significant deviation from historical usage rates and notify customers of such deviation. This may enable the customer to update or generate one or more grants to impose a usage rate limitation for users and particular cryptographic keys. In an embodiment, based at least in part on the usage rates identified through the one or more data logs 610, the grant evaluation engine 604 accesses the grant datastore 612 to update one or more grants to impose the usage rates identified through the one or more data logs 610. Thus, if a client exceeds the imposed usage rate specified in a grant, the grant evaluation engine 604 may cause the cryptographic key management service 602 to throttle the client's access to the cryptographic key through use of any of the mechanisms described above in connection with FIGS. 3-5.

Figure 7:
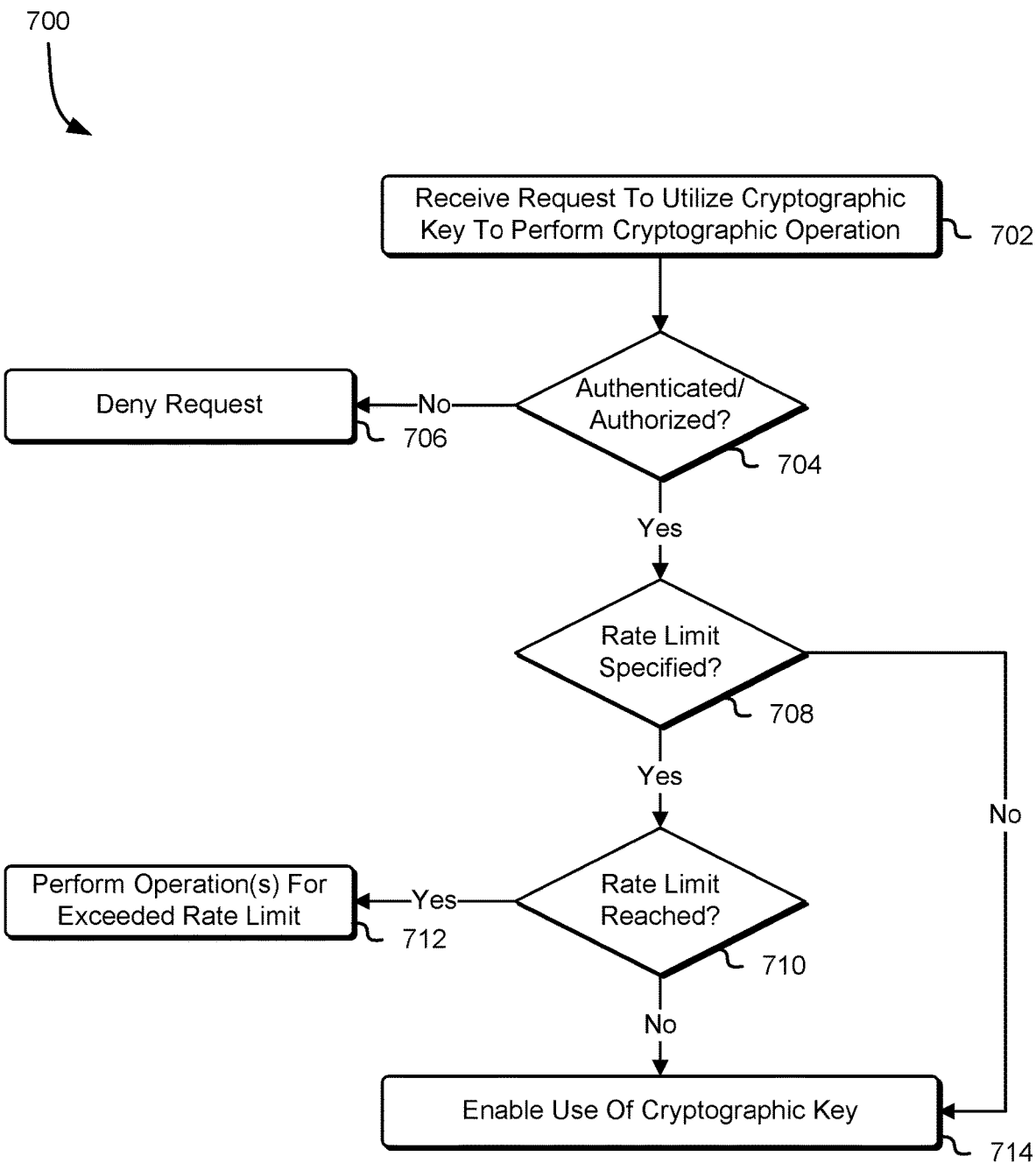
FIG. 7 shows an illustrative example of a process 700 for enabling use of a cryptographic key if a rate limit imposed on use of the cryptographic key has not been exceeded in accordance with at least one embodiment.

As noted above, the cryptographic key management service, in response to a request from a client to utilize a cryptographic key to perform one or more cryptographic operations, may evaluate one or more grants applicable to the request to determine whether the user is authorized to enable use of the cryptographic key to fulfill the request. Further, the one or more grants may impose one or more rate limitations to the use of the cryptographic key. To enforce the rate limitation, the cryptographic key management service may perform use one or more throttling mechanisms, such as the mechanisms described above in connection with FIGS. 3-5. Accordingly, FIG. 7 shows an illustrative example of a process 700 for enabling use of a cryptographic key if a rate limit imposed on use of the cryptographic key has not been exceeded in accordance with at least one embodiment. The process 700 may be performed by the aforementioned cryptographic key management service, which may evaluate one or more grants in response to the client request to determine whether a rate limitation has been imposed on the client.

At any time, the cryptographic key management service may receive 702 a request to utilize a cryptographic key to perform one or more cryptographic operations. For instance, a client may submit a request to the service to cause the service to use a cryptographic key to decrypt data maintained by another computing resource service provided by the computing resource service provider. The request may specify a unique principal identifier, an identifier for the cryptographic key, an identifier for each applicable grant, and the like. Additionally, the request may include one or more credentials or information that may be used to determine that the client has access to the one or more credentials of the client.

In response to the request, the cryptographic key management service may determine 704 whether the client can be authenticated and is authorized to enable use of the cryptographic key for performance of the one or more cryptographic operations. The cryptographic key management service may transmit the unique user identifier and the provided credentials or proof of access to the credentials to an authentication service of the computing resource service provider. The authentication service may evaluate the provided information to determine whether the client can be authenticated. For instance, the authentication service may access a user profile for the client to obtain information that can be used to verify the provided information. If the authentication service determines that the information provided is valid and corresponds to the client, the authentication service may authenticate the client and transmit a notification to the cryptographic key management service to indicate that the client has been successfully authenticated.

The cryptographic key management service may utilize the information provided in the request to identify one or more grants that may be applicable to the request. The one or more grants may identify a principal, which may include a user, a group of users, roles assumed by the users, and the like. Further, the one or more grants may identify the target cryptographic key to which the one or more grants are applicable. Additionally, the one or more grants may specify the actions that may be performed with regard to the cryptographic key and any constraints to the use of the cryptographic key. For instance, the one or more grants may indicate that a particular client is permitted to enable use of the cryptographic key to decrypt certain data. Alternatively, the one or more grants may indicate that a particular group of users is not authorized to enable use of the cryptographic key. In some embodiments, the absence of a grant applicable to the request serves as an indication that the client is not authorized to enable use of the cryptographic key. Alternatively, the absence of grant may serve as an indication that the client is authorized to enable use of the cryptographic key.

If the client cannot be authenticated or is not authorized to enable use of the cryptographic key, the cryptographic key management service may deny 706 the client's request. However, if the cryptographic key management service determines that the client has been successfully authenticated and that it is authorized to enable use of the cryptographic key, the cryptographic key management service may determine 708 whether a usage rate limit for the cryptographic key is specified within the one or more grants applicable to the request. As described above, a customer of the computing resource service provider may generate one or more grants that include a usage rate limitation for its cryptographic key in order to throttle utilization of the cryptographic key. Alternatively, the cryptographic key management service may utilize historical usage data of cryptographic keys to identify and impose usage patterns on the use of the cryptographic keys. In some instances, the usage rate limitations are imposed through the user account without need to impose the rate limitations through grants.

The cryptographic key management service may enable 714 use of the cryptographic key to perform the one or more cryptographic operations if no usage rate limitations are specified in the one or more grants or in the user account. However, if a usage rate limitation for use of the cryptographic key is specified within the one or more grants or in the user account, the cryptographic key management service may evaluate usage data for the client and for the cryptographic key to determine 710 whether the usage rate limitation has been reached or the usage rate exceeds the limit. If the usage rate limitation has been reached or usage of the cryptographic key has surpassed the limitation, the cryptographic key management service may perform 712 one or more operations for an exceeded usage rate limitation. For example, the cryptographic key management service may utilize a token container to enforce the rate limitation. The cryptographic key management service may access the token container to deduct a token that may be used to fulfill the request. This token container may include a limited number of tokens that are replenished in accordance with the usage rate limitation. Thus, if the usage rate for the cryptographic key exceeds the limitation, the tokens may not be replenished prior to a subsequent request to use the cryptographic. If the token container does not have a token available, the cryptographic key management service may deny the request or wait until a token becomes available for use. In some alternative embodiments, the cryptographic key management service can submit one or more challenges to the client that may be computationally extensive and that may require the client to generate a response to enable use of the key. These challenges are described in greater detail above in connection with FIGS. 3-5.

If the usage rate limitation has not been reached, the cryptographic key management service may enable 714 use of the cryptographic key to perform the one or more cryptographic operations. For instance, the cryptographic key management service may use the cryptographic key, on behalf of the client, to decrypt the requested data and may provide the data to the client for its use. Alternatively, the cryptographic key management service may use the cryptographic key, on behalf of the client, to encrypt data specified in the request and may store the encrypted data on behalf of the client.

Figure 8:
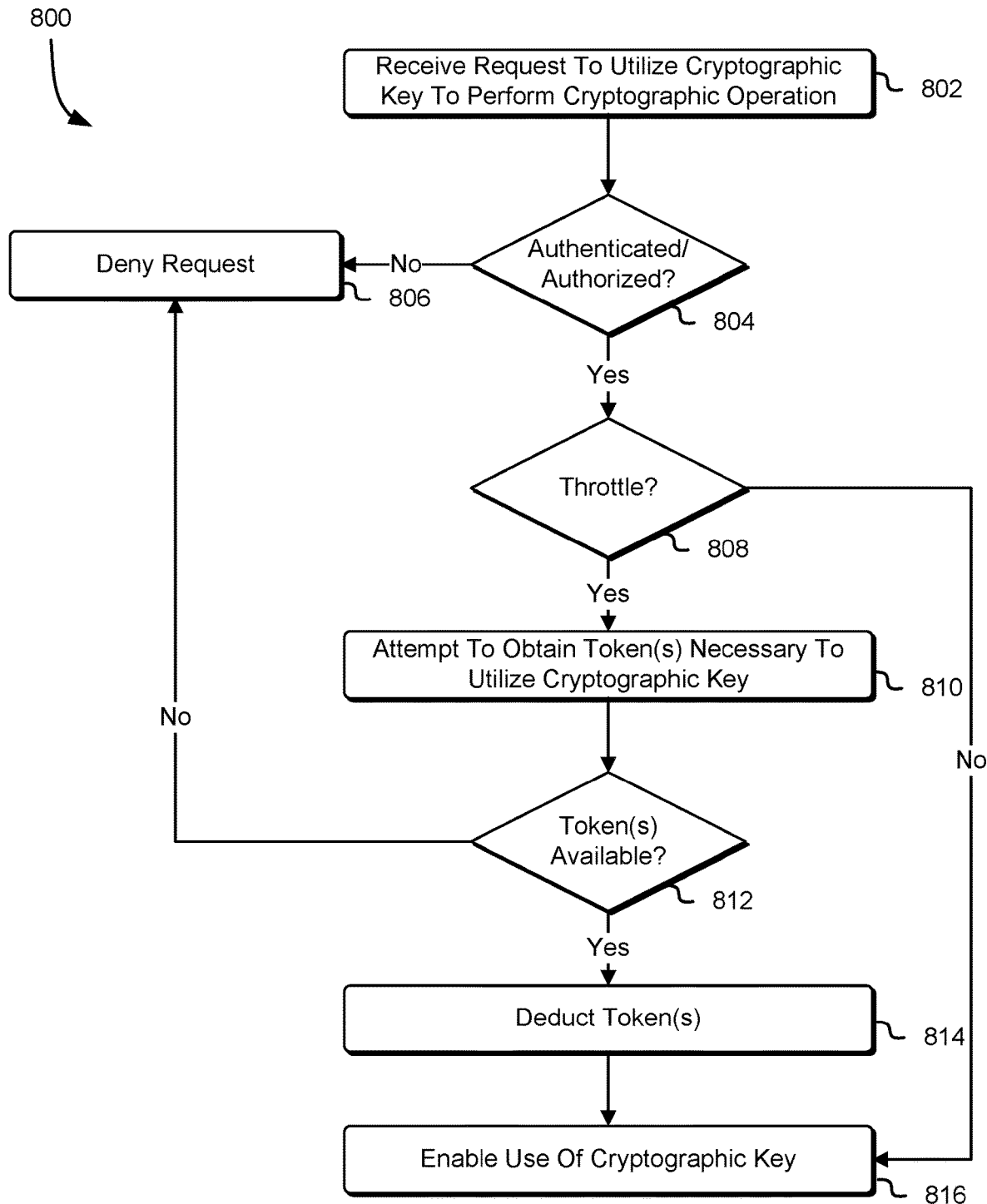
FIG. 8 shows an illustrative example of a process for enabling use of a cryptographic key based at least in part on the availability of one or more tokens from a token container in accordance with at least one embodiment.

As noted above, a cryptographic key management service may utilize a token container to enforce a usage rate limitation for users attempting to enable use of a cryptographic key to perform one or more cryptographic operations. The token container may contain a limited number of tokens that may be required to fulfill requests to use the cryptographic key. The token container may be replenished at a rate commensurate to the usage rate limitation specified in the corresponding one or more grants for the cryptographic key and for the users. Accordingly, FIG. 8 shows an illustrative example of a process 800 for enabling use of a cryptographic key based at least in part on the availability of one or more tokens from a token container in accordance with at least one embodiment. The process 800 may be performed by the aforementioned cryptographic key management service.

Similar to the process 700 described above, the cryptographic key management service may receive 802 a request to utilize a cryptographic key to perform one or more cryptographic operations. The request may specify a unique user identifier, an identifier for the cryptographic key, identifiers for grants applicable to the request, and the like. Additionally, the request may include one or more credentials or information that may be used to determine that the client has access to the one or more credentials of the user. The cryptographic key management service may utilize the information provided in the request to determine 804 whether the client can be successfully authenticated and is authorized to enable use of the requested cryptographic key. If the client cannot be successfully authenticated or, based at least in part on the one or more grants applicable to the request, the client is not authorized to enable use of the cryptographic key, the cryptographic key management service may deny 806 the client's request.

If the client is successfully authenticated and is authorized to enable use of the cryptographic key, the cryptographic key management service may evaluate the one or more grants applicable to the request to determine 808 whether use of the cryptographic key is subject to one or more throttling conditions, such as a usage rate limitation for the cryptographic key. A throttling condition may specify that the client may not exceed a particular usage rate limitation specified in the one or more grants. If the client and the cryptographic key are not subject to a throttling condition, the cryptographic key management service may enable 816 use of the cryptographic key to perform the one or more cryptographic operations specified in the request. However, if the request is subject to a throttling condition, the cryptographic key management service may access a token container for the cryptographic key to attempt to obtain 810 one or more tokens necessary to enable use of the cryptographic key.

As described above, the token container may contain a limited number of tokens that are required to enable use of a cryptographic key. The number of tokens may be limited according to the usage rate limitations imposed for the particular cryptographic key or for the particular user. Thus, the token container may be specific to a particular cryptographic key or to a particular user, as defined through the usage rate limitations imposed through the one or more grants. Additionally, the tokens of the token container may be replenished subject to the imposed usage rate limitations in place for the cryptographic key or the user. Thus, if a client submits requests to enable use of the cryptographic key at a rate that exceeds the usage rate limitation, the token container may be depleted of tokens prior to being able to replenish any tokens.

The cryptographic key management service may determine 812 whether there are any tokens available in the token container that can be used to fulfill the request. If the cryptographic key management service determines that the token container does not have any tokens available, the cryptographic key management service may deny 806 the client's request. Alternatively, the cryptographic key management service may wait until a token becomes available. The cryptographic key management service may transmit a notification to the client to indicate that it has exceeded its rate usage limitation and that it will be required to wait until a new token becomes available before being allowed to enable use of the cryptographic key to perform the one or more cryptographic operations. If the cryptographic key management service determines that one or more tokens are available in the token container, the cryptographic key management service may deduct 814 one or more tokens from the token container that may be necessary to fulfill the request. Additionally, the cryptographic key management service may enable 816 use of the cryptographic key to perform the requested one or more cryptographic operations.

Figure 9:
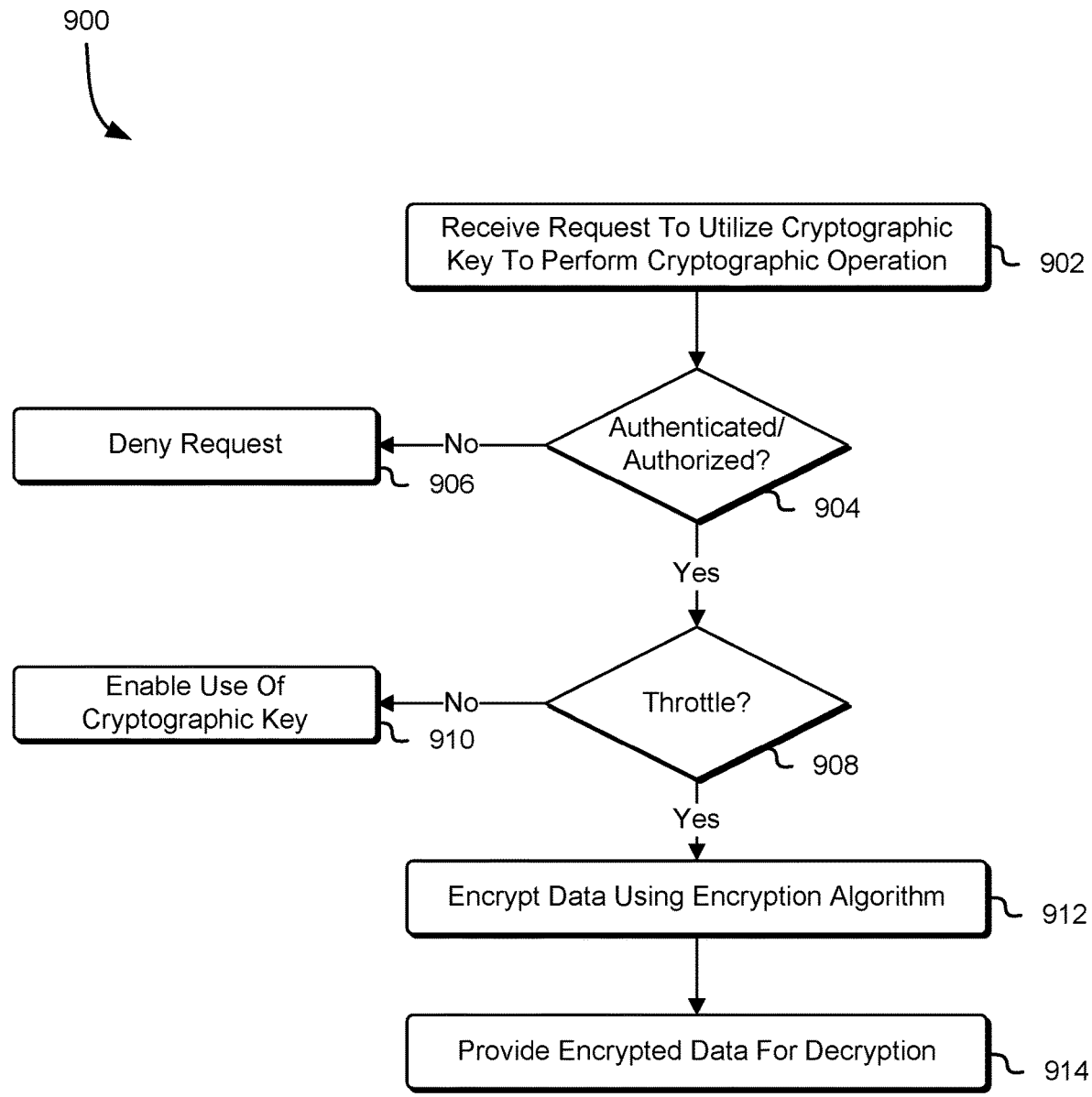
FIG. 9 shows an illustrative example of a process for providing data previously encrypted using the cryptographic key encrypted using an encryption algorithm to a user in response to a request to utilize a cryptographic key to perform a cryptographic operation in accordance with at least one embodiment.

As noted above, a cryptographic key management service may provide one or more challenges to a client submitting a request to enable use of a cryptographic key if the client or the cryptographic key is subject to usage rate limitations for use of the cryptographic key. For instance, the cryptographic key management service may issue a challenge to the client, which the client may be required to solve in order to enable use of the cryptographic key to perform a cryptographic operation. The challenge may be in the form of encryption of the data requested by the client, to which the client would have to calculate a second cryptographic key necessary to decrypt the encrypted data. Accordingly, FIG. 9 shows an illustrative example of a process 900 for providing data previously encrypted using the cryptographic key encrypted using an encryption algorithm to a user in response to a request to utilize a cryptographic key to perform a cryptographic operation in accordance with at least one embodiment. The process 900 may be performed by the aforementioned cryptographic key management service.

Similar to the other processes described above, the cryptographic key management service may receive 902 a request to utilize a cryptographic key to perform one or more cryptographic operations. The cryptographic key management service may utilize the information provided in the request to determine 904 whether the client can be successfully authenticated and is authorized to enable use of the requested cryptographic key. If the client cannot be successfully authenticated or, based at least in part on the one or more grants applicable to the request, the client is not authorized to utilize the cryptographic key, the cryptographic key management service may deny 906 the client's request.

If the client is successfully authenticated and is authorized to enable use of the cryptographic key to perform a cryptographic operation, the cryptographic key management service may evaluate the one or more grants applicable to the request to determine 908 whether use of the cryptographic key is subject to one or more throttling conditions, such as a usage rate limitation for the cryptographic key. If the client or the cryptographic key are not subject to one or more throttling conditions, the cryptographic key management service may enable 910 use of the cryptographic key to perform the one or more requested cryptographic operations. However, if the cryptographic key or the client is subject to one or more throttling conditions on the use of the cryptographic key, the cryptographic key management service may decrypt the requested data using the cryptographic key. Further, the cryptographic key management service may encrypt 912 the data using an encryption algorithm. For example, the cryptographic key management service may use a hash-based key derivation function to generate a second cryptographic key that can be used to encrypt the data. The second cryptographic key may be calculated by selecting a random value, hashing the random value a number of times based at least in part on the throttling condition, and using the output of the hash function as the second cryptographic key. In some embodiments, the encryption of the data using the encryption algorithm is performed in addition to any other encryption that may be performed for transmitting the data over a communications channel to the client, such as a Transport Layer Security (TLS) or Secure Sockets Layer (SSL) communications channel. Thus, the cryptographic key management service may encrypt 912 the data using the encryption algorithm and further encrypt the output using TLS or SSL protocols.

In an alternative embodiment, the cryptographic key management service utilizes RSA encryption to encrypt the data to be provided to the client to fulfill the request. For instance, the cryptographic key management service may select two prime numbers whose size may be dependent on the throttling condition specified in the one or more grants or on the deviation from the throttling condition. The cryptographic key may multiply the two prime numbers to obtain a modulus value, which is used to calculate a totient. Using the totient, the cryptographic key management service may generate the private and public cryptographic keys for RSA encryption. The cryptographic key management service may use the public cryptographic key to encrypt the data and may discard the private cryptographic key. In this manner, the prime numbers or the public cryptographic key may be sized based at least in part on the throttling condition specified in the one or more grants or on the deviation from the throttling condition.

The cryptographic key management service may provide 914 the encrypted data to the client to fulfill the request and to enable the client to decrypt the data. The cryptographic key management service may also provide information that can be used by the client to decrypt the encrypted data. For instance, if the data is encrypted using a hash-based key derivation function, the cryptographic key management service may provide, to the client, the random value used as input to the function and the number of hashing iterations required to calculate the second cryptographic key necessary to decrypt the encrypted data. Alternatively, if the cryptographic key management service uses RSA encryption or other public cryptographic key cryptosystem to encrypt the data, the cryptographic key management service may provide, to the client, the public cryptographic key used to encrypt the data. The client may utilize the public cryptographic key and the encrypted data to calculate the private cryptographic key necessary to decrypt the data.

Figure 10:
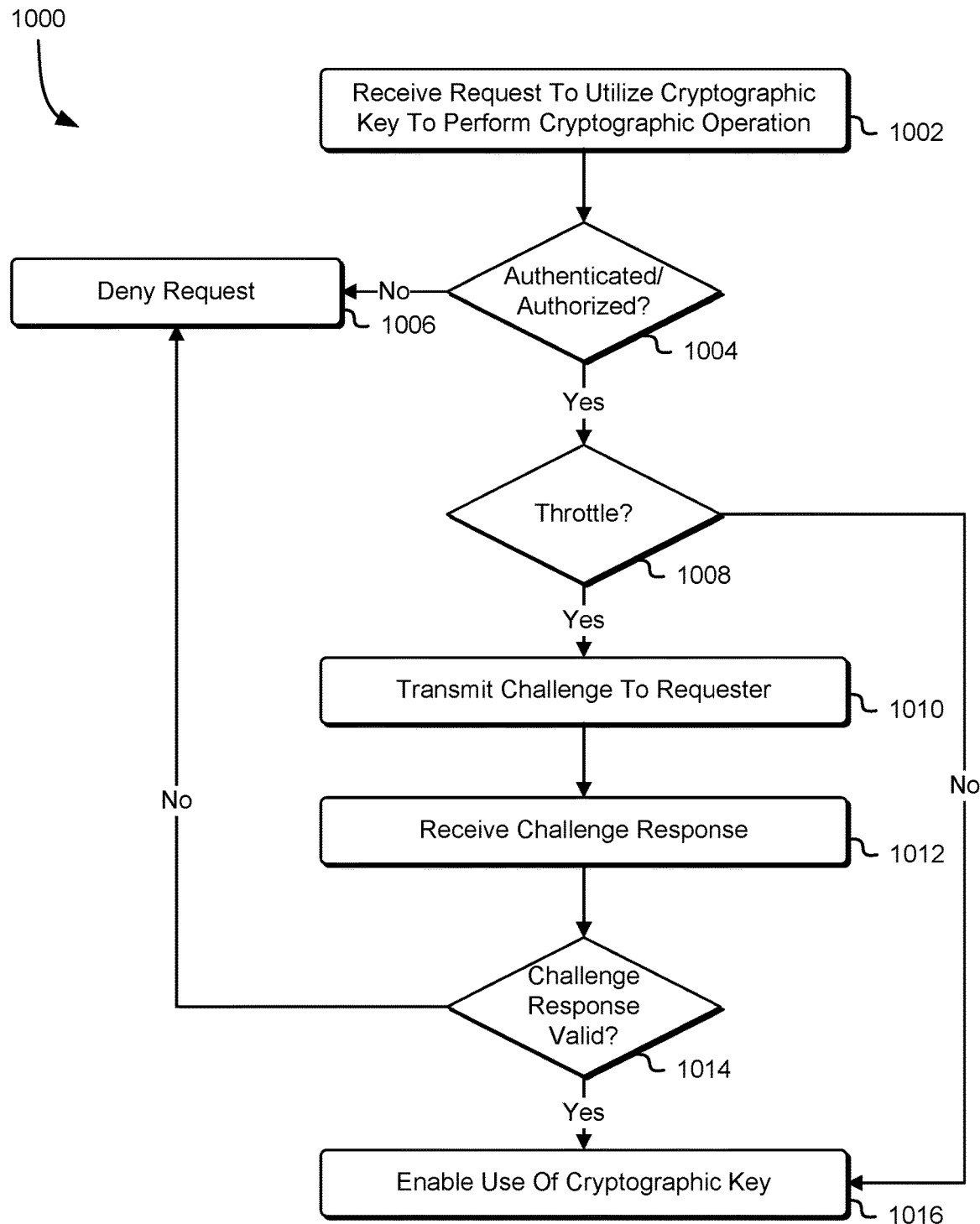
FIG. 10 shows an illustrative example of a process for evaluating a challenge response from a user to determine whether to enable use of a cryptographic key in response to a request to use the cryptographic key in accordance with at least one embodiment.

In some embodiments, if a user or cryptographic key is subject to one or more throttling conditions, the cryptographic key management service submits one or more challenges to the client utilized by the user. The client may be required to provide a valid challenge response to the challenge submitted by the cryptographic key management service in order to enable use of the cryptographic key for performance of one or more cryptographic operations. Accordingly, FIG. 10 shows an illustrative example of a process 1000 for evaluating a challenge response from a client to determine whether to enable use of a cryptographic key in response to a request to use the cryptographic key in accordance with at least one embodiment. The process 1000 may be performed by the aforementioned cryptographic key management service.

Similar to the other processes described above, the cryptographic key management service may receive 1002 a request to enable use of a cryptographic key to perform one or more cryptographic operations. The cryptographic key management service may utilize the information provided in the request to determine 1004 whether the client can be successfully authenticated and is authorized to enable use of the requested cryptographic key. If the client cannot be successfully authenticated or, based at least in part on the one or more grants applicable to the request, the client is not authorized to enable use of the cryptographic key, the cryptographic key management service may deny 1006 the client's request. However, if the client is successfully authenticated and is authorized to enable use of the cryptographic key, the cryptographic key management service may evaluate the one or more grants applicable to the request to determine 1008 whether use of the cryptographic key is subject to one or more throttling conditions. If the client or the cryptographic key are not subject to one or more throttling conditions, the cryptographic key management service may enable 1016 use of the cryptographic key to perform the one or more requested cryptographic operations.

If the client or the cryptographic key is subject to a throttling condition, the cryptographic key management service may craft a challenge configured to have a difficulty based at least in part on the throttling condition and the client's deviation from the throttling condition. For instance, if the client deviation from the throttling condition is significant, the challenge crafted by the cryptographic key management service may be more difficult to solve and may require additional computational work to generate a challenge response. Alternatively, if the client satisfies the throttling condition or the deviation from the throttling condition is minimal, the challenge may be easier to solve. The challenge may include a CAPTCHA challenge, a set of cryptographic operations that are to be performed by the client to compute a value that can be verified by the cryptographic key provisioning engine, or any other operation based at least in part on one or more proof-of-work protocols. The cryptographic key management service may transmit 1010 the challenge to the requester (e.g., client) to enable the requester to generate a challenge response to the challenge.

The client may receive the challenge from the cryptographic key management service and generate, in response to the challenge, a challenge response that may be provided to the cryptographic key management service. The response may include a plaintext response to a CAPTCHA challenge. Alternatively, the response may include a value used to generate a challenge value provided by the cryptographic key management service and that can be used by the service to quickly verify the validity of the value. The cryptographic key management service may receive 1012 the challenge response from the client and determine 1014 whether the challenge response is valid. For instance, the cryptographic key management service may obtain the expected response to the challenge and compare this expected response to the received challenge response to determine whether there is a match. If the responses do not match, then the challenge response may not be valid. Alternatively, the cryptographic key management service may input the challenge response into an algorithm to determine whether the output of the algorithm corresponds to a value expected by the cryptographic key management service. If the output does not correspond to an expected value, the cryptographic key management service may determine that the challenge response is not valid.

If the challenge response provided by the client is not valid, the cryptographic key management service may deny 1006 the request to utilize the cryptographic key. In an alternative embodiment, if the client provides an invalid challenge response, the cryptographic key management service will continue to await a valid challenge response from the client. The request may be subject to one or more timeout rules whereby the request is automatically terminated if a valid challenge response is not provided within a limited period of time. Alternatively, the cryptographic key management service may issue a new challenge to the client if the client is unable to successfully provide a challenge response to the original challenge. However, if the client is able to provide a valid challenge response to the challenge submitted by the cryptographic key management service, the cryptographic key management service may enable 1016 the use of the cryptographic key to perform the one or more cryptographic operations specified in the request.

Figure 11:
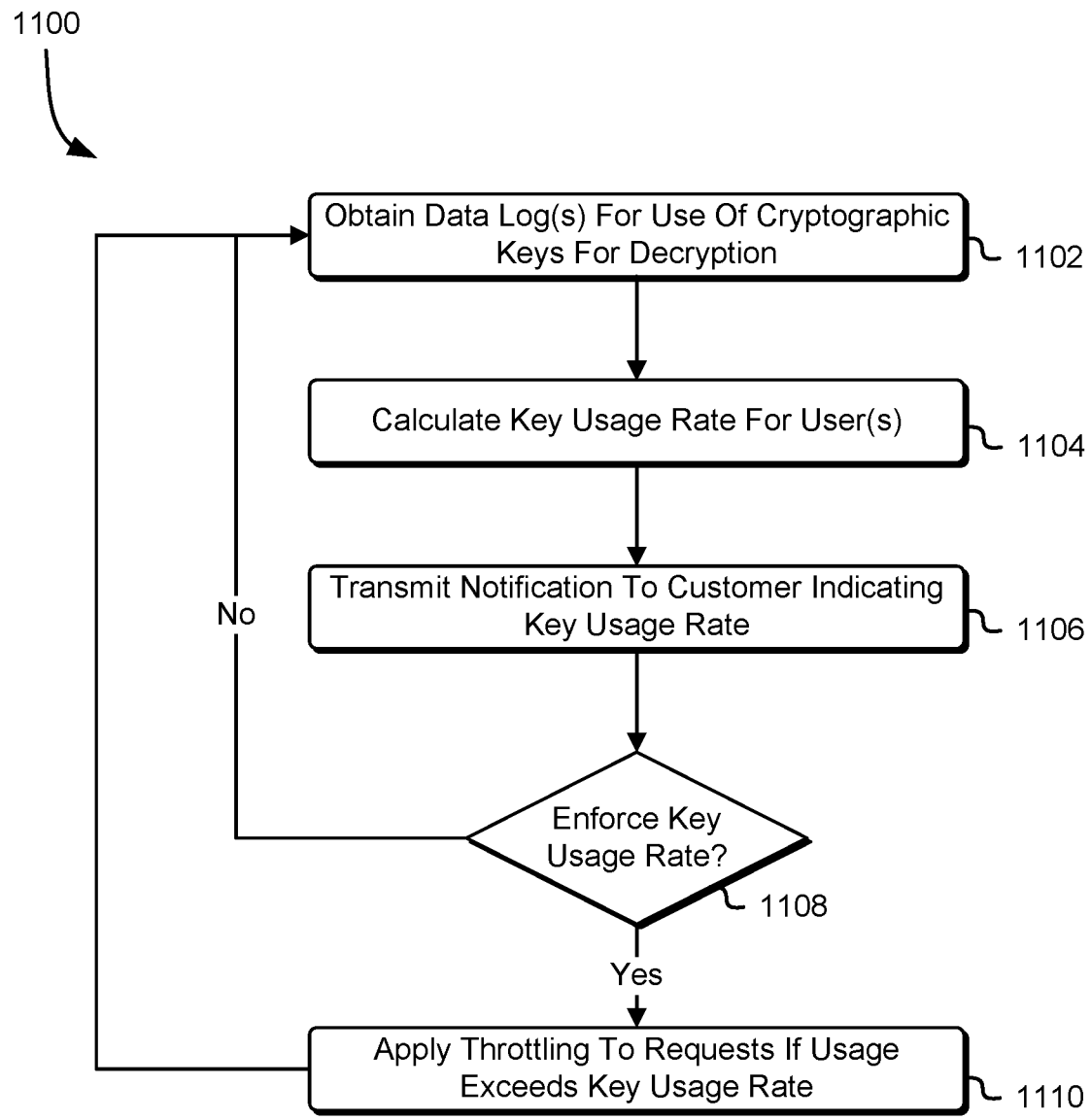
FIG. 11 shows an illustrative example of a process for using data logs corresponding to use of cryptographic keys to calculate a rate limitation for use of the cryptographic keys in accordance with at least one embodiment.

As noted above, the cryptographic key management service may utilize data logs from a resource monitoring service to determine a historical usage rate for cryptographic keys. The cryptographic key management service may provide these historical usage rates for the cryptographic keys to customers of the computing resource service provider to enable these customers to create one or more usage rate limitations for their cryptographic keys. In some embodiments, the cryptographic key management service can use the historical usage rate data for the cryptographic keys to impose a usage rate limit to the use of the cryptographic keys. Accordingly, FIG. 11 shows an illustrative example of a process 1100 for using data logs corresponding to use of cryptographic keys to calculate a rate limitation for use of the cryptographic keys in accordance with at least one embodiment. The process 1100 may be performed by the aforementioned cryptographic key management service, which may obtain the data logs from the resource monitoring service or from the one or more other services themselves.

The cryptographic key management service may obtain 1102 one or more data logs from either the computing resource monitoring service, which may aggregate cryptographic key usage data from various computing resource services, or from the one or more computing resource services. The data logs may specify, per cryptographic key and per user, the use over time of the cryptographic keys maintained by the cryptographic key management service. For instance, the one or more data logs may provide timestamps for events related to decryption of data maintained by the one or more computing resource services. Further, the data logs may specify, for each event recorded therein, an identifier of the cryptographic key used to decrypt the data, an identifier of the entity that submitted the request to use the cryptographic key, the actual decryption operations performed and the like.

The cryptographic key management service may use the obtained one or more data logs to calculate 1104 a cryptographic key usage rate for each user of the cryptographic keys provided by the cryptographic key management service. For example, the cryptographic key management service may evaluate the data logs to identify each entry in the data logs that corresponds to a particular user. For that user, the cryptographic key management service may identify each cryptographic key the user, through a client, has requested use of and use the data per cryptographic key to identify a rate at which the user utilizes each cryptographic key. The cryptographic key management service may use this information to determine a usage rate for the user. In some embodiments, the cryptographic key management service identifiers a usage rate for each cryptographic key across all users to establish a baseline usage rate for the cryptographic key. The cryptographic key management service may compare a user's usage rate to the baseline usage rate for a particular cryptographic key to detect any anomalous behavior.

The cryptographic key management service may transmit 1106 a notification to customers of the computing resource service provider that may maintain one or more cryptographic keys through the service to indicate the usage rates for their cryptographic keys. The notification may specify the baseline cryptographic key usage rate across all users of the cryptographic key, as well as the usage rate for each user of the cryptographic key. The customer may utilize the information specified in the notification to determine whether to impose a usage rate limitation for the customer's cryptographic keys or to specific users of the customer's cryptographic keys. The customer may submit a request to the cryptographic key management service to generate one or more grants that may include such usage rate limitations for users and for specific cryptographic keys.

Based at least in part on customer responses and the calculated cryptographic key usage rates for users and the cryptographic keys, the cryptographic key management service may determine 1108 whether to enforce a usage rate limitation for a cryptographic key or for one or more users of the cryptographic key. For instance, if the customer generates a grant that imposes a usage rate limitation for a cryptographic key or for a user of the cryptographic key, the cryptographic key management service may apply 1110 throttling mechanisms to requests from users that are subject to the grant if the usage rate for the user or the cryptographic key exceeds the usage rate limitation specified in the grant. This may include use of token containers to control the rate at which requests to use a cryptographic key are processed, submitting challenges to users to provide a challenge response or to calculate a key that can be used to decrypt the cryptographic key. The cryptographic key management service may continue to obtain 1102 data logs from the resource monitoring service and from the one or more other services of the service provider to continually evaluate cryptographic key usage rates for users and for the cryptographic keys themselves. This enables the cryptographic key management service to update usage rate limitations as needed.

Figure 12:
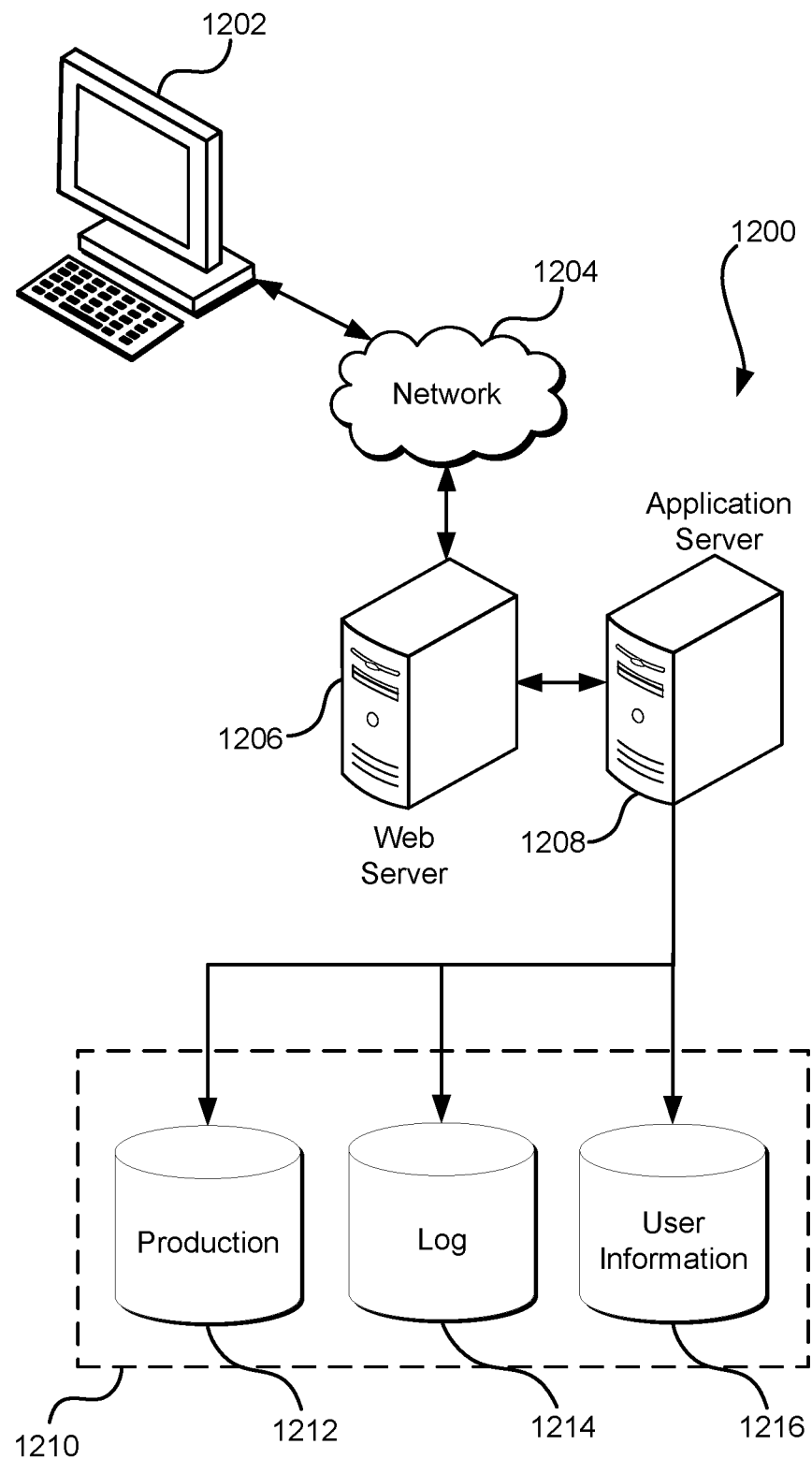
FIG. 12 shows an illustrative example of an environment in which various embodiments can be implemented.

FIG. 12 illustrates aspects of an example environment 1200 for implementing aspects in accordance with various embodiments. As will be appreciated, although a web-based environment is used for purposes of explanation, different environments may be used, as appropriate, to implement various embodiments. The environment includes an electronic client device 1202, which can include any appropriate device operable to send and/or receive requests, messages, or information over an appropriate network 1204 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment.

The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of Hyper-Text Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 1202 and the application server 1208, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1210 can include several separate data tables, databases, data documents, dynamic data storage schemes and/or other data storage mechanisms and media for storing data relating to a particular aspect of the present disclosure. For example, the data store illustrated may include mechanisms for storing production data 1212 and user information 1216, which can be used to serve content for the production side. The data store also is shown to include a mechanism for storing log data 1214, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. The application server 1208 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1202. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C #or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining, from a client device associated with a principal of a customer of a computing resource service provider, a request to utilize a cryptographic key to perform a cryptographic operation;
    providing a challenge to the client device;
    obtaining, as a result of an input from the principal being obtained by the client device, a challenge response to the challenge;
    determining whether the challenge response is valid;
    as a result of a determination that the challenge response is valid and that the request complies with a usage rate limitation associated with the cryptographic key, performing the cryptographic operation; and
    providing a response to the request.

2. The computer-implemented method of claim 1, wherein:
    the request specifies a grant;
    the grant specifies a permission delegated to the principal to utilize the cryptographic key to perform a set of cryptographic operations;
    the grant further specifies a difficulty of a challenge question and a corresponding usage rate limitation;
    the challenge is determined based at least in part on the difficulty of the challenge question; and
    performing the cryptographic operation comports with the usage rate limitation that is specified in the grant.

3. The computer-implemented method of claim 1, wherein:
    the cryptographic operation includes a decryption operation;
    the challenge includes an input value to an algorithm accessible at the client device;
    the challenge response includes an output value from the algorithm; and
    the challenge response is determined to be valid based at least in part by comparing the output value to an expected value for the challenge.

4. The computer-implemented method of claim 1, further comprising, as a result of determining the challenge response is invalid, denying the request.

5. A system, comprising:
one or more processors; and
memory including instructions that, as a result of being executed by the one or more processors, cause the system to:
obtain a first request to use a cryptographic key to perform a first cryptographic operation, the first request from a client device that is associated with a principal of a customer of a computing resource service provider;
provide a first challenge to the client device;
obtaining, as a result of an input from the principal being obtained by the client device, a first challenge response;
determine whether the first challenge response is valid;
as a result of a determination that the first challenge response is valid and that the request complies with a usage rate limitation associated with the cryptographic key, performing the first cryptographic operation; and
provide a response to the first request.

6. The system of claim 5, wherein the instructions further cause the system to determine, based at least in part on the first request, whether a challenge requirement specific to the principal is associated with the cryptographic key.

7. The system of claim 5, wherein the instructions further cause the system to:
use the cryptographic key to decrypt data;
generate a second challenge;
provide, with the response, the data and the second challenge;
receive, from the client device, a second request to use the cryptographic key to perform a second cryptographic operation, the second request including a second challenge response to the second challenge;
determine whether the second challenge response indicates successful completion of the second challenge; and
if the second challenge response indicates a successful completion of the second challenge, use the cryptographic key to perform the second cryptographic operation.

8. The system of claim 5, wherein the instructions further cause the system to:
determine, based at least in part on a grant associated with the cryptographic key and an identification of the principal associated with the client device, that a rate limit applies to the request;
determine that fulfilling the first request would exceed the rate limit; and
wherein the first challenge is provided to the client device as a result of the determination that fulfilling the first request would exceed the rate limit.

9. The system of claim 5, wherein the instructions further cause the system to:
use the cryptographic key to perform the first cryptographic operation, resulting in output data;
generate a second cryptographic key;
use the second cryptographic key to encrypt the output data, generating encrypted data; and
provide the encrypted data to enable a client of the principal to derive the second cryptographic key to decrypt the encrypted data.

10. The system of claim 5, wherein the instructions further cause the system to, as a result of obtaining an invalid challenge response from the client device, deny the request.

11. The system of claim 5, wherein the instructions further cause the system to:
evaluate a grant specifying a permission delegated to the principal to utilize the cryptographic key to perform a set of cryptographic operations to determine whether a rate limit specific to the principal is associated with the cryptographic key; and
wherein the first challenge is provided to the client device as a result of determining that the rate limit specific to the principal would be exceeded by fulfilling the first request.

12. The system of claim 5, wherein the instructions further cause the system to:
obtain, by a cryptographic key management service, a grant from the customer of the computing resource service provider; and wherein:
the grant specifies one or more entities that are authorized to use the cryptographic key and a rate limit for using the cryptographic key to perform one or more cryptographic operations;
the cryptographic key is controlled by the cryptographic key management service;
the first cryptographic operation includes using the cryptographic key to decrypt data of the customer that is stored at one or more services of the computing resource service provider; and
the response includes the decrypted data.

13. A non-transitory computer-readable storage medium having stored thereon executable instructions that, as a result of being executed by one or more processors of a computer system, cause the computer system to at least:
obtain a request to use a cryptographic key to perform a cryptographic operation, the request from a client device that is associated with a principal of a customer of a computing resource service provider;
provide a challenge to the client device;
obtain, as a result of an input from the principal being obtained by the client device, a challenge response;
determine whether the challenge response is valid;
as a result of a determination that the challenge response is valid, performing the cryptographic operation and that the request complies with a usage rate limitation associated with the cryptographic key; and
provide a response to the request.

14. The non-transitory computer-readable storage medium of claim 13, wherein the instructions further cause the computer system to,
if the usage rate limitation is associated with the cryptographic key, generate the response to the request, wherein the response enforces the usage rate limitation by at least causing operations to be performed that would not be performed if the usage rate limitation was not associated with the cryptographic key.

15. The non-transitory computer-readable storage medium of claim 13, wherein the instructions further cause the computer system to:
as a result of obtaining the request, obtain one or more grants associated with the request, the one or more grants specifying the usage rate limitation for the cryptographic key; and wherein:
the challenge is generated as a result of a determination that the principal is subject to the usage rate limitation for the cryptographic key;
the challenge includes one or more other cryptographic operations to be performed by the client device to compute a value;

the challenge response is determined to be valid at least in part by comparing the computed value with an expected value;

the cryptographic operation is performed to obtain output data; and the output data is provided to the client device through the response.

16. The non-transitory computer-readable storage medium of claim 13, wherein the instructions further cause the computer system to:

access a token container to determine whether a token required to perform the cryptographic operation is available; and if the token required to perform the cryptographic operation is available, deduct the token from the token container; and wherein output data is obtained from the cryptographic operation being performed, and the output data is provided to the client device through the response.

17. The non-transitory computer-readable storage medium of claim 13, wherein:

the cryptographic operation includes using the cryptographic key to perform a decryption operation on encrypted data to obtain decrypted data;

the encrypted data is maintained for the customer at one or more services of the computing resource service provider;

the decrypted data is provided to the client device through the response; and the request is obtained by a key management service of the computing resource service provider, wherein the key management service controls access to the cryptographic key.

18. The non-transitory computer-readable storage medium of claim 13, wherein the instructions further cause the computer system to:

obtain, in response to obtaining the request, a grant of the customer, wherein the grant specifies a permission delegated to the principal to utilize the cryptographic key to perform a set of cryptographic operations;

evaluate the grant to determine the usage rate limitation; and controlling a rate that data of the response is provided in accordance with the usage rate limitation.

19. The non-transitory computer-readable storage medium of claim 13, wherein:

the cryptographic operation generates output data;

providing the response includes transmitting the output data to the client device; and the instructions further cause the computer system to, if the challenge response is determined to be invalid, reduce a rate at which the output data is transmitted to the client device.

20. The non-transitory computer-readable storage medium of claim 13, wherein:

the cryptographic operation generates output data;

providing the response includes transmitting the output data to the client device; and the instructions further cause the computer system to, as a result of the determination that the challenge response is valid, increase a rate at which the output data is transmitted to the client device.

* * * * *